US012456396B2

(12) United States Patent
Demello et al.

(10) Patent No.: US 12,456,396 B2
(45) Date of Patent: Oct. 28, 2025

(54) PALLET SAFETY APPARATUS AND METHOD

(71) Applicants: Alan J. Demello, Newmarket, NH (US); Mark D. Lorusso, Portsmouth, NH (US)

(72) Inventors: Alan J. Demello, Newmarket, NH (US); Mark D. Lorusso, Portsmouth, NH (US)

( * ) Notice: Subject to any disclaimer, the term of this patent is extended or adjusted under 35 U.S.C. 154(b) by 200 days.

(21) Appl. No.: 18/207,181

(22) Filed: Jun. 8, 2023

(65) Prior Publication Data

US 2024/0412667 A1 Dec. 12, 2024

(51) Int. Cl.

*G09F 13/16* (2006.01)
*B65D 19/38* (2006.01)
*G09F 13/04* (2006.01)

(52) U.S. Cl.

CPC ............. *G09F 13/16* (2013.01); *B65D 19/38* (2013.01); *G09F 13/0422* (2021.05); *G09F 13/0431* (2021.05); *B65D 2203/12* (2013.01)

(58) Field of Classification Search

CPC .. G09F 13/16; G09F 13/0422; G09F 13/0431; B65D 19/38; B65D 2203/12
See application file for complete search history.

(56) References Cited

U.S. PATENT DOCUMENTS

| | | | | |
|---|---|---|---|---|
| 3,167,291 | A | 1/1965 | Maguire | |
| 7,617,627 | B1 | 11/2009 | Waidelich | |
| 2006/0249642 | A1 | 11/2006 | Mavis et al. | |
| 2008/0314297 | A1* | 12/2008 | Macqueen | B65D 19/38 108/42 |
| 2010/0031543 | A1 | 2/2010 | Rice et al. | |
| 2014/0104057 | A1* | 4/2014 | Futrell | B60Q 1/2611 2/102 |
| 2016/0253931 | A1* | 9/2016 | Sakko | E01F 9/60 40/582 |
| 2018/0251344 | A1* | 9/2018 | Jammikunta | B65D 19/06 |
| 2024/0017881 | A1* | 1/2024 | Martin | B65D 19/38 |

FOREIGN PATENT DOCUMENTS

| | | | |
|---|---|---|---|
| CN | 111080939 | B | 4/2020 |
| DE | 29609217 | U1 | 10/1996 |
| DE | 202009017036 | U1 | 4/2010 |
| EP | 1016361 | A2 | 7/2000 |
| WO | 2009/068897 | A1 | 6/2009 |

* cited by examiner

*Primary Examiner* — Gary C Hoge
(74) *Attorney, Agent, or Firm* — LORUSSO & ASSOCIATES

(57) ABSTRACT

A pallet safety marker apparatus to provide a visual warning of the presence of a pallet. The safety marker apparatus includes a base structured to be inserted under, around and/or on a corner of a pallet. A safety-marker post extends upwardly from the base and may include offset, tilting and/or telescopic segments and visual enhancements. A safety marker/topper secured to a top end of the post formed in a geometric shape with color, texture and/or luminescent patterns to provide a visually-distinct warning. The post and/or topper may be translucent or transparent with enclosed lighting to impart a visual warning. Extendable/retractable safety bands may be incorporated into the safety markers/toppers.

18 Claims, 23 Drawing Sheets

PALLET SAFETY APPARATUS AND METHOD

CROSS-REFERENCE TO RELATED APPLICATIONS

[001] None.

FIELD OF THE INVENTION

This disclosure relates generally to safety apparatus to provide visual notice of a potential safety hazard. More particularly, the disclosure relates to pallet-warning apparatus to provide visual warnings of the presence of a pallet in a specific area.

BACKGROUND OF THE DISCLOSURE

In today's world of global commerce, products and product packaging are shipped around the world, often on palletized loads. Pallets have a ubiquitous presence in the manufacturing world in particular. They provide a secure means to safely move products from manufacturers to the warehouses of distributors, wholesalers and retailers.

Although pallets facilitate the transport and organization of goods, there very presence provides an inherent safety hazard. By design, pallets are essentially flat and low to the ground. They are easily overlooked in a crowded warehouse or factory. When loaded with products, often, the only portions of the pallets visible are their sides. Two sides often are solid as they are part of the support structure for the slats that form the tops and bottoms of the pallet. The ends are left open, i.e., the ends of the frame pieces are not closed off to permit the forks of a fork lift or similar device to enable the pallet to be engaged for lifting. These open ends, although quite useful, also present a potential tripping hazard as a person's foot can slide into the open slots and potentially cause a fall.

When products are being manufactured, there also can be raw materials stored on pallets in the active work area. As raw materials are consumed, the pallets are emptied and become less visible. In such a state, they present a more significant tripping hazard, especially if positioned close to an active walkway, or even worse, near a sharp corner or where two designated walkways intersect. Conversely, as products are produced, in many cases, the finished products are stored on pallets. This process, of course, starts with an empty pallet filled over time. Such pallets also present a tripping hazard during the early stages of being filled.

Another safety hazard is the stacking of pallets, if only two or three are stacked, they can be below one's field of vision when walking within the vicinity of the pallets. Again, such an arrangement presents a tripping hazard. Pallets also are arranged in designated floor areas that are set apart with striping placed on the floor of a factory or warehouse. These floor areas are often square or rectangular patterns that have obvious sharply-defined corners. Pallets stored in the corners of these designated areas are of particular concern with respect to tripping and safety in general.

What is needed is a means to give a visual alert to passersby that a pallet is present. More particularly, what is needed is a visual warning apparatus set within one's field of vision to provide sufficient warning that a pallet is under foot or close. Such an apparatus should be easy to assemble, low-cost, require little or no maintenance, and be easily movable to promote use and reuse of the devices. These and other objects of the disclosure will become apparent from a reading of the following summary and detailed description of the disclosure.

SUMMARY OF THE DISCLOSURE

In one aspect of the disclosure, a pallet safety apparatus or marker includes a solid base structured to be secured to a corner of a pallet. An elongate post extends upwardly from the base. Secured to a top of the post is a visually distinct safety-marker head or topper that can be formed in a variety of shapes, textures and colors to generate immediate attention from anyone passing by the marker. The safety-marker apparatus may be modular or comprised of fixed components.

In another aspect of the disclosure, the base is structured as a hinge with flanges to accommodate a variety of pallet shapes, especially differently-angled corners that result from different pallet shapes such as square and octagonal. In alternative embodiments, the base may be structured to be superposed about a pallet corner and/or placed on top of a pallet corner to provide the desired visual warning.

In a further aspect of the disclosure, the base is a weighted plate that sits on top of a pallet with side plates that extend downwardly to wrap around a pallet corner. In a still further aspect of the disclosure, the base may be formed with ratcheting features to enable the base to be compressively secured to a pallet corner. In yet another aspect of the disclosure, the base may be formed with an "L" shape to sit on the floor, registered against a pallet corner. A hook extension may be added to the L-shaped base for insertion into the open end of a pallet to register against an end-rim pallet framing member to releasably lock the base to the pallet corner.

In another aspect of the disclosure, the elongate post may be modified in a number of variations including telescopic to accommodate different elevational needs relative to a specific pallet or group of pallets. The elongate posts also may be offset within the field or outside the field of the pallet to which the safety-marker apparatus is attached to eliminate a potential bumping hazard. An offset post also may include telescopic portions to enhance the adjustability of the apparatus. The elongate post may be tiltable. These and other aspects of the disclosure will become apparent from a review of the appended drawings and a reading of the following detailed description of the disclosure.

DETAILED DESCRIPTION OF THE DISCLOSURE

Figure 1:
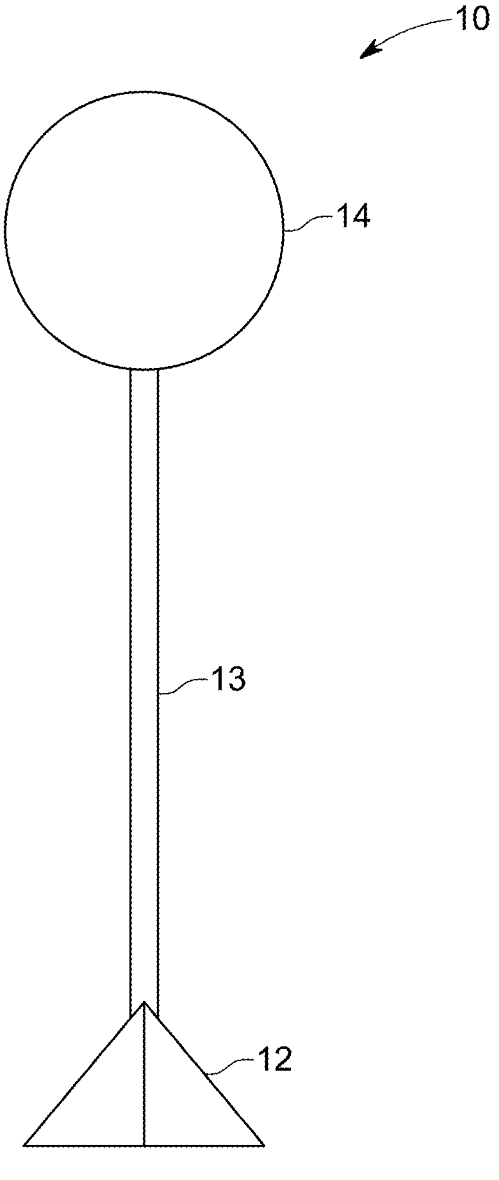
FIG. 1 is a front view in elevation of a pallet safety marker apparatus according to one embodiment of the disclosure.
Figure 2:
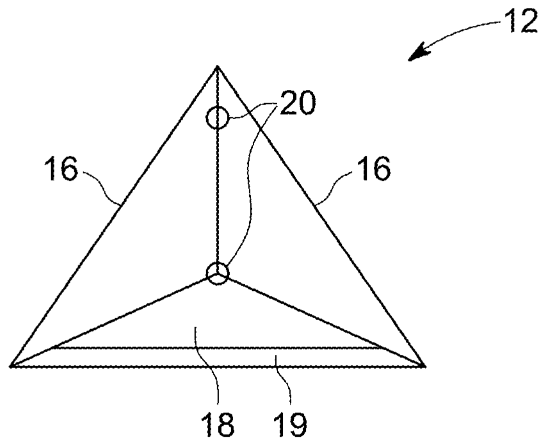
FIG. 2 is a front perspective view of a pallet safety marker base according to the embodiment show in in FIG. 1.
Figure 3:
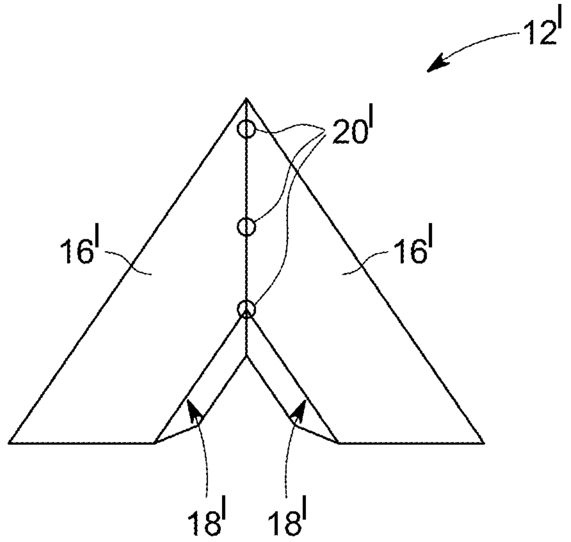
FIG. 3 is a front perspective view of a hinged pallet safety marker base according to another embodiment of the disclosure.

Referring to FIGS. 1 and 2, a pallet safety apparatus or marker, shown generally as 10, includes a base 12 structured to be inserted under the corner of a pallet. Base 12 includes two triangular-shaped side plates 16 set at a 90° angle relative to one another. Bottom ends of the side plates 16 are secured together with a base plate 18. A leading edge 19 of base plate 18 may be formed with a taper to facilitate insertion of base 12 under a pallet. In an alternate embodiment as shown in FIG. 3, in place of base plate 18 of base 12, side plates 16' each may be formed with a flange 18' extending inwardly from a bottom edge of each side plate 16'. The leading edges of each flange 18' may be formed with a taper to facilitate insertion under a pallet corner. It should be understood that the overall shapes of side plates 16 and base plate 12 may diverge from the shown triangular shapes and remain within the scope of the disclosure. It further should be understood that the features of base plate 12 can be made to be solid or hollow and conform to any geometric shape and remain within the scope of the disclosure.

Base 12 and base 12' each have further portions defining post-receiving bores or rings 20, 20', respectively, dimensioned to receive a safety-marker post 13. Post-receiving bores or rings 20, 20' may be spaced with one positioned proximal to a lower end of the side plates 16, 16' and a second positioned proximal to an upper end of side plates 16, 16'. Alternatively, a single, elongate post-receiving bore may be used to secure safety-marker post 13. It should be understood that more than two post-receiving bores or rings 20, 20' can be used to secure post 13 and remain within the scope of the disclosure.

Allen screws (and the like), and corresponding threaded bores may be formed in the field of rings 20, 20', the combination of which may be used to mechanically fix post 13 to base 12, 12'. In one alternative embodiment, a friction-fit attachment means may be used by setting the cross-sectional diameters of the rings 20, 20' and/or the post 13 to have descending tapered cross-sectional diameters along their axial lengths. Adhesives, welding (sonic, arc, stick, etc.), or injection molding are further non-limiting illustrative alternative means that may be used to secure post 13 to base 12, 12'. The method used to secure post 13 to base 12, 12' is in large part dependent upon the materials used to make the components. Polymer-based materials may involve injection molding whereas metal-based materials may involve the use of welding, adhesives and/or mechanical fasteners.

Figure 18:
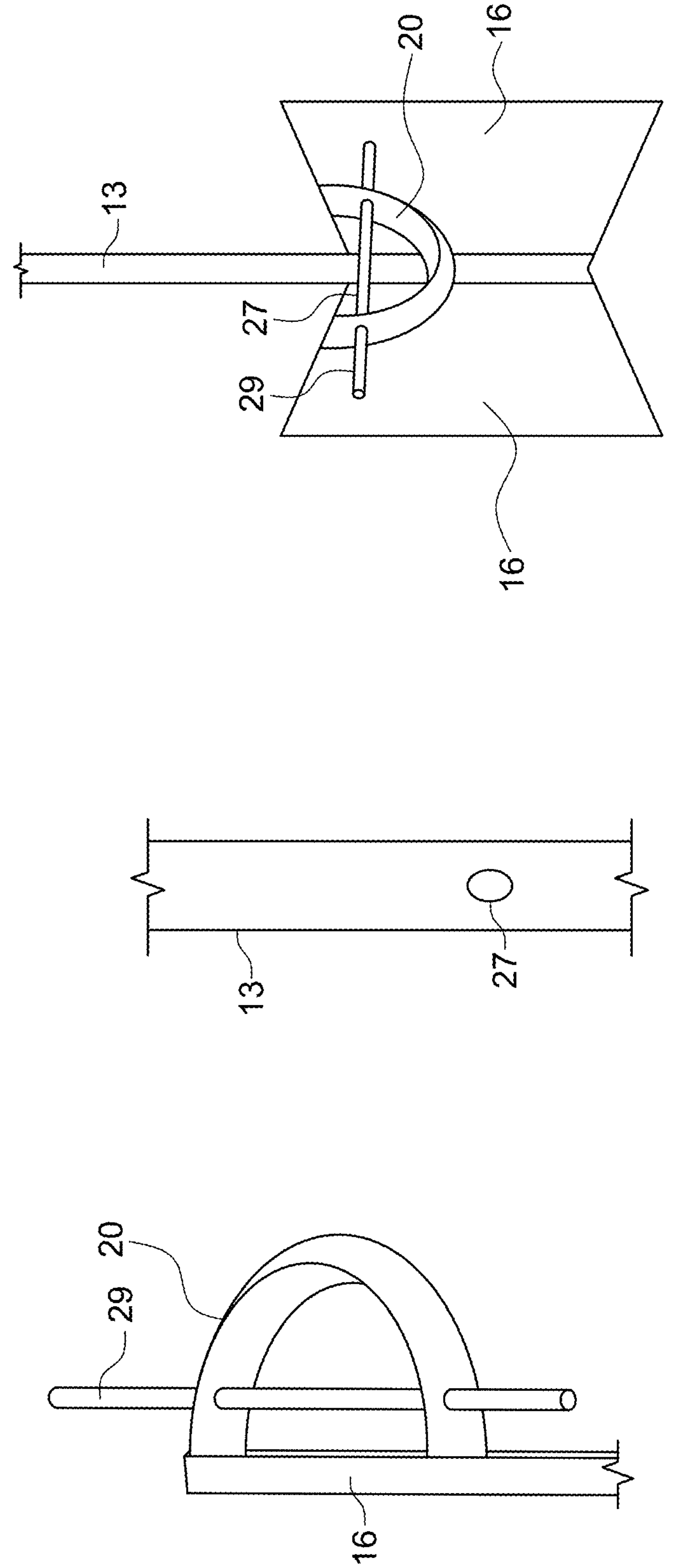
FIG. 18 is a series of views of a safety-marker post securing means using a locking pin according to one embodiment of the disclosure.
Figure 19:
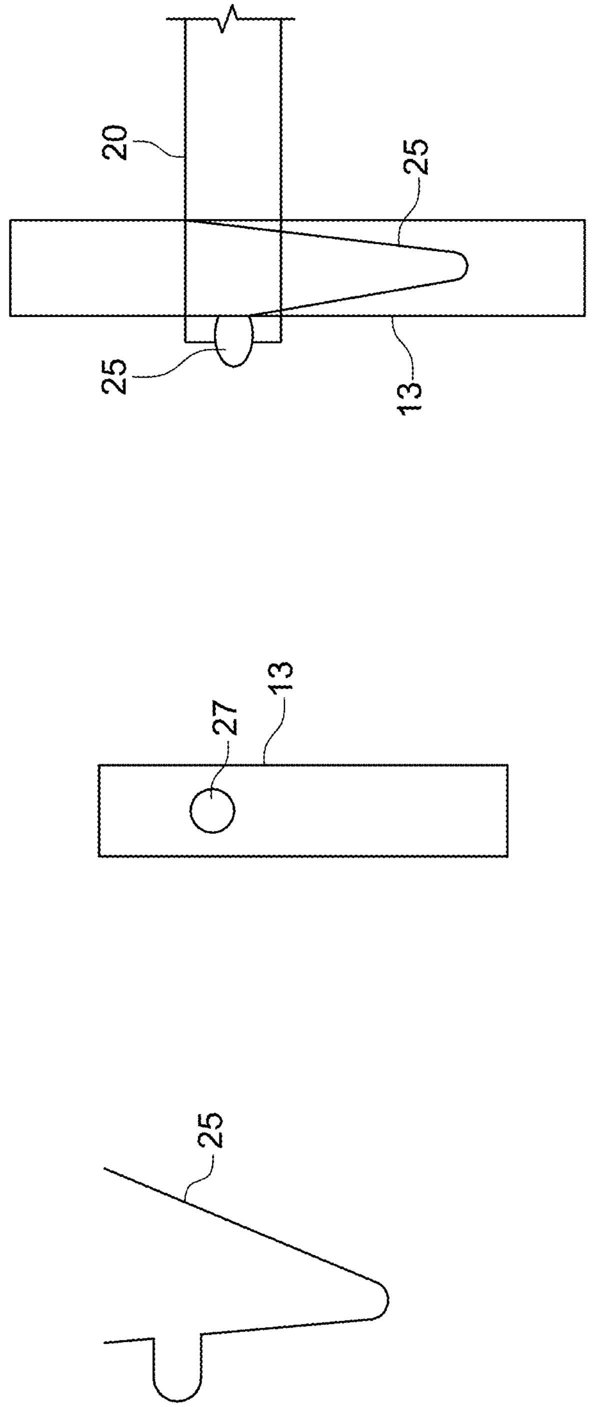
FIG. 19 is a series of views of a snap-pin locking means to secure a safety-marker post to a base according to another embodiment of the disclosure.

To improve the binding effect or frictional engagement between post 13 and post-receiving bores or rings 20, a series of ridges may be formed on a bottom end of post 13 in the area inserted into rings 20 (shown in FIG. 18). Alternatively, ridges may be informed on the internal surface area of rings 20 or formed on both the post and the rings. In a still further alternative embodiment as shown in FIG. 18, rings 20 and post 13 may include removable locking pins 29 secured through bores formed in rings 20 and pin bores 27 formed in post 13 at selected points along the post to ensure full insertion of the post into the rings. This provides a means to easily disassemble the pallet marker apparatus to store when not in use and/or to move the apparatus to a different location. As shown in FIG. 19, snap pin 25 secured in post 13 and snapped into a corresponding bore formed in ring 20 is yet another alternative means that may be used to releasably secure post 13 to base 12.

Figure 4:
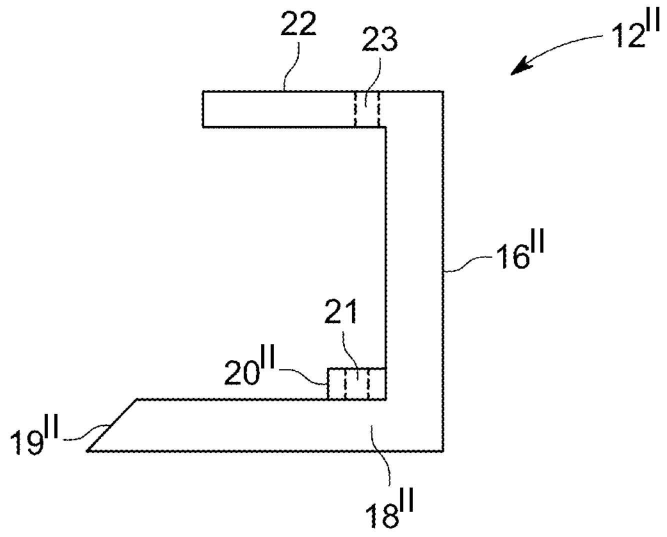
FIG. 4 is a side view in elevation and partial phantom of a pallet safety marker base according to yet another embodiment of the disclosure.
Figure 5:
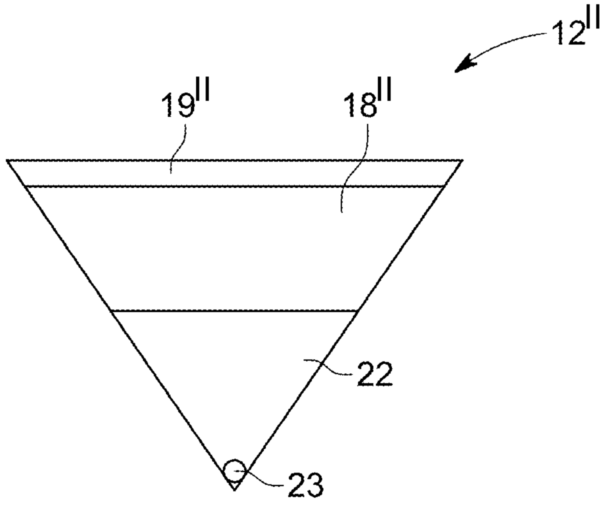
FIG. 5 is a top view of the pallet safety marker base shown in FIG. 4.

Referring now to FIGS. 4 and 5, in a further embodiment, a base 12" is structured to be superposed about a pallet corner. Base 12" includes a side plate 16" and a bottom plate 18" extending inwardly from a bottom end of side plate 16" with a tapered leading edge 19". A top plate 22 extends inwardly from a top end of side plate 16". A top-plate through-bore 23 is formed in top plate 22 proximal to side plate 16" and dimensioned to receive safety-marker post 13. A base post-receiving ring 20" that defines a bore 21 is formed on a top surface of bottom plate 18" proximal side plate 16" and dimensioned to receive a bottom end of safety-marker post 13. This embodiment of the base provides a more robust registration to a pallet that prevents tipping of the safety marker away from the pallet corner.

Figure 6:
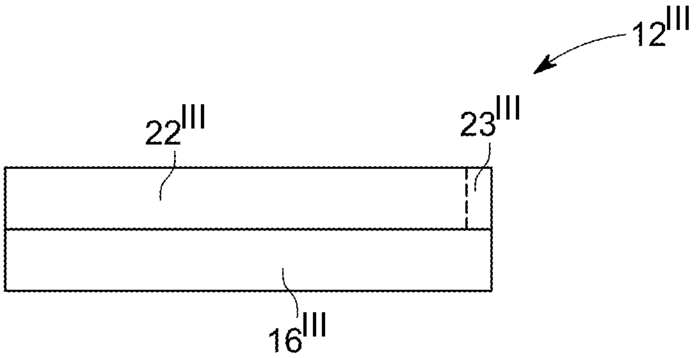
FIG. 6 is a side view in elevation of a pallet safety marker base according to a further embodiment of the disclosure.
Figure 7:
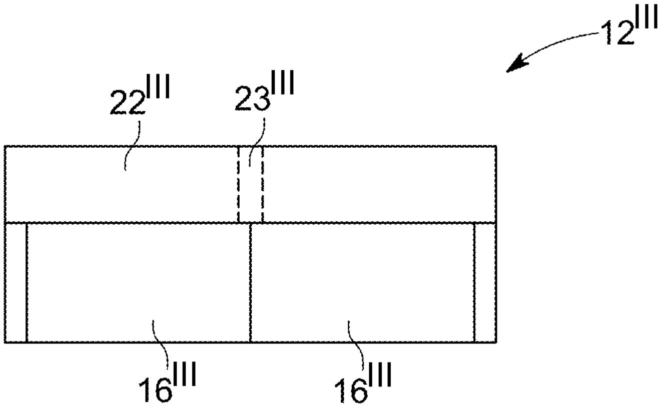
FIG. 7 is a front view in elevation and partial phantom of the pallet safety marker base shown in FIG. 6.
Figure 8:
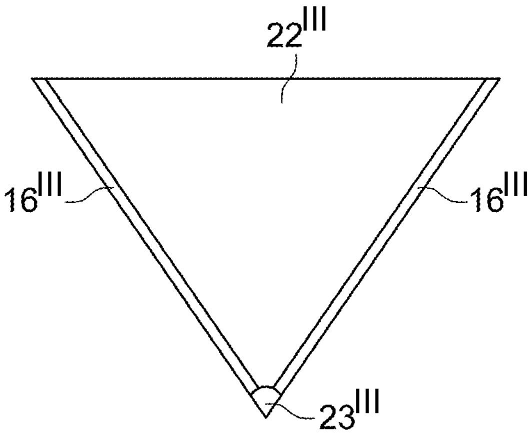
FIG. 8 is a bottom view of the pallet safety marker base shown in FIG. 6.

Referring now to FIGS. 6-8, a base 12''' takes the form of a weighted base to be placed on the top of a pallet corner. In this embodiment, base 12''' is substantially triangular shaped although a square or rectangular shape can be used. A weighted top plate 22''' has two side plates 16''' that extend downwardly from side edges of top plate 22'''. A partial or complete through-bore 23''' is formed at the apex of the triangle to receive safety marker post 13. This base embodiment provides a means to secure the safety marker apparatus to a pallet heavily weighted with product for which it would be difficult to slide base 12 under the pallet corner.

Figure 26:
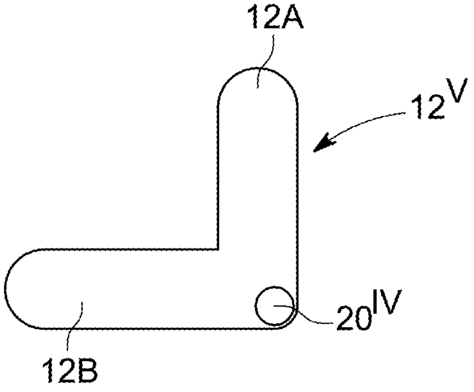
FIG. 26 is a top plan view of a safety-marker base according to yet another embodiment of the disclosure.
Figure 27:
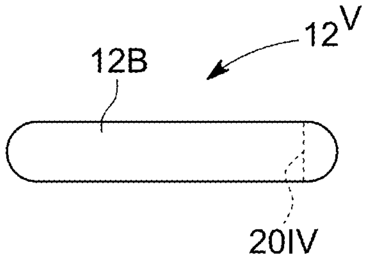
FIG. 27 is a side view in elevation of the safety-marker base shown in FIG. 26.

Referring now to FIGS. 26 and 27, in yet another embodiment of the base, a base, designated generally as $\mathbf{12}^{V}$ is structured in the form of an "L" with a first base arm 12A and a second base arm 12B so as to wrap around a pallet corner without being inserted under or over the corner. Base $\mathbf{12}^{V}$ is weighted to provide a stable base for the components of the safety-marker apparatus attached thereto. A partial or complete through-bore $\mathbf{20}^{V}$ is formed at the apex of the triangle to receive safety marker post 13. Base $\mathbf{12}^{V}$ can be used with any of the other post and safety-marker elements of the safety-marker apparatuses disclosed herein.

Figure 30:
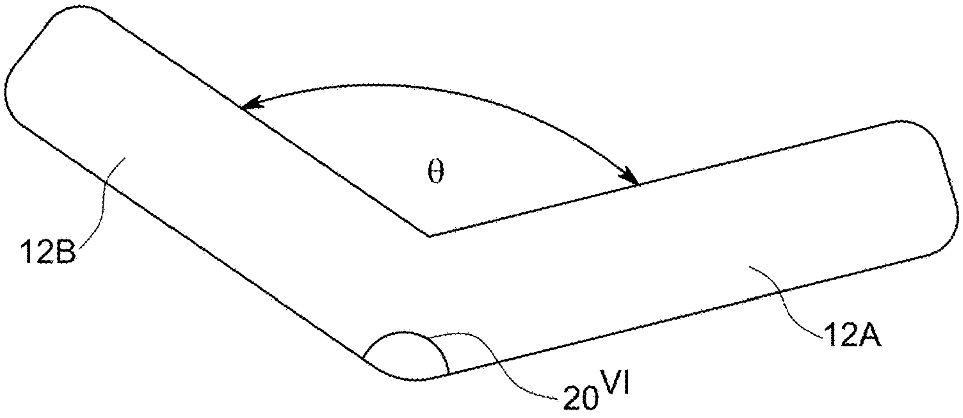
FIG. 30 is a top plan view of a safety-marker base according to a further embodiment of the disclosure.

Referring now to FIG. 30, in a further embodiment of the base, a base, designated generally as $\mathbf{12}^{VI}$, has the same first and second base arms, 12A and 12B, of base $\mathbf{12}^{V}$, however the angle theta formed by the arms is set to match the angle formed by the corner of a pallet that does not have 90° angle corners. A partial or complete through-bore $\mathbf{20}^{VI}$ is formed at the apex of the triangle to receive safety marker post 13. Base $\mathbf{12}^{VI}$ can be used with any of the other post and safety-marker elements of the safety-marker apparatuses disclosed herein.

Figure 31:
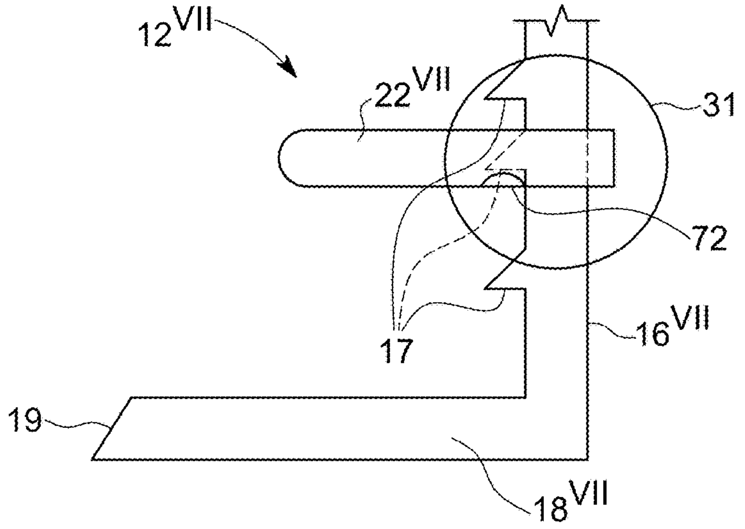
FIG. 31 is a side view in elevation and partial phantom of a safety-marker base according to a yet further embodiment of the disclosure.
Figure 32:
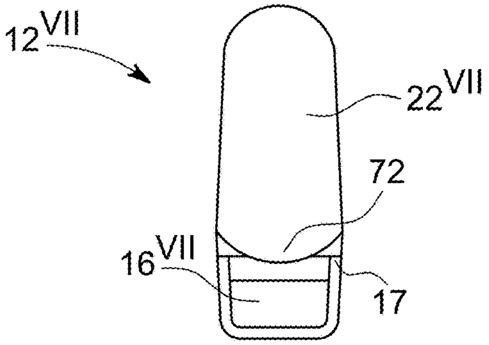
FIG. 32 is a bottom view of the safety-marker base shown in FIG. 31.
Figure 33:
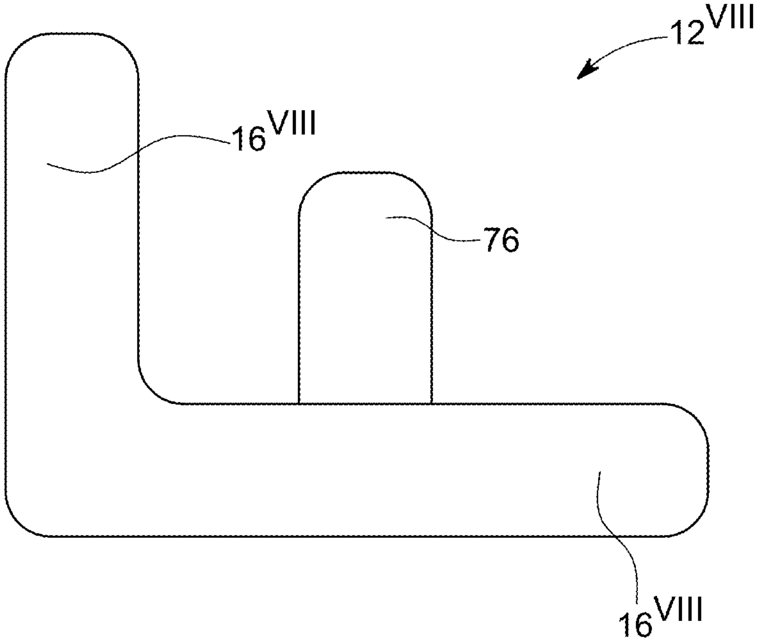
FIG. 33 is a top view of a safety-marker base according to another embodiment of the disclosure.
Figure 34:
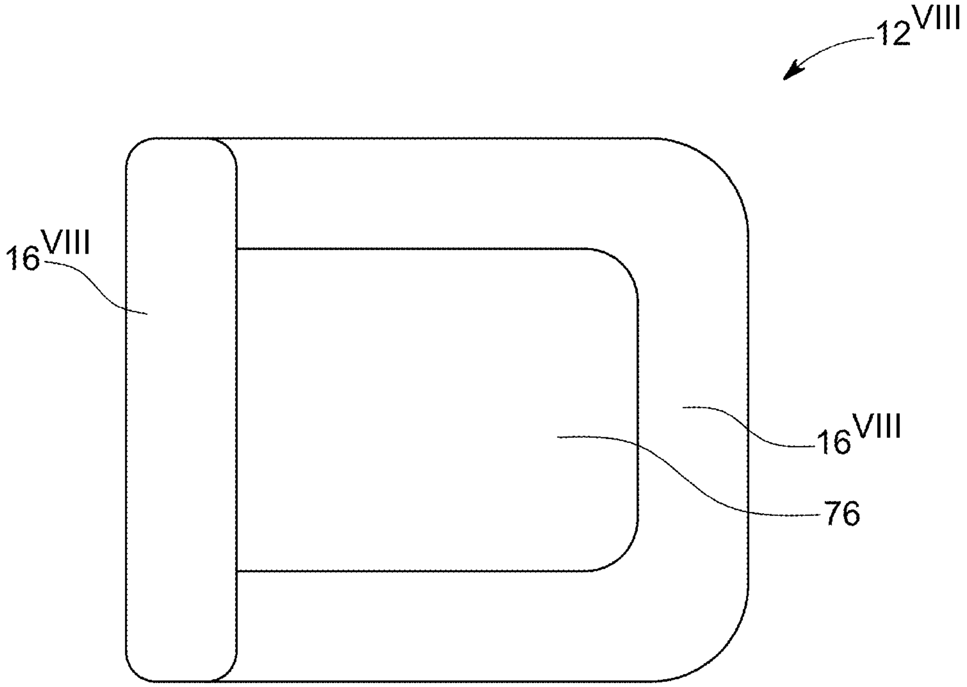
FIG. 34 is a side view in elevation of the safety-marker base shown in FIG. 33.
Figure 35:
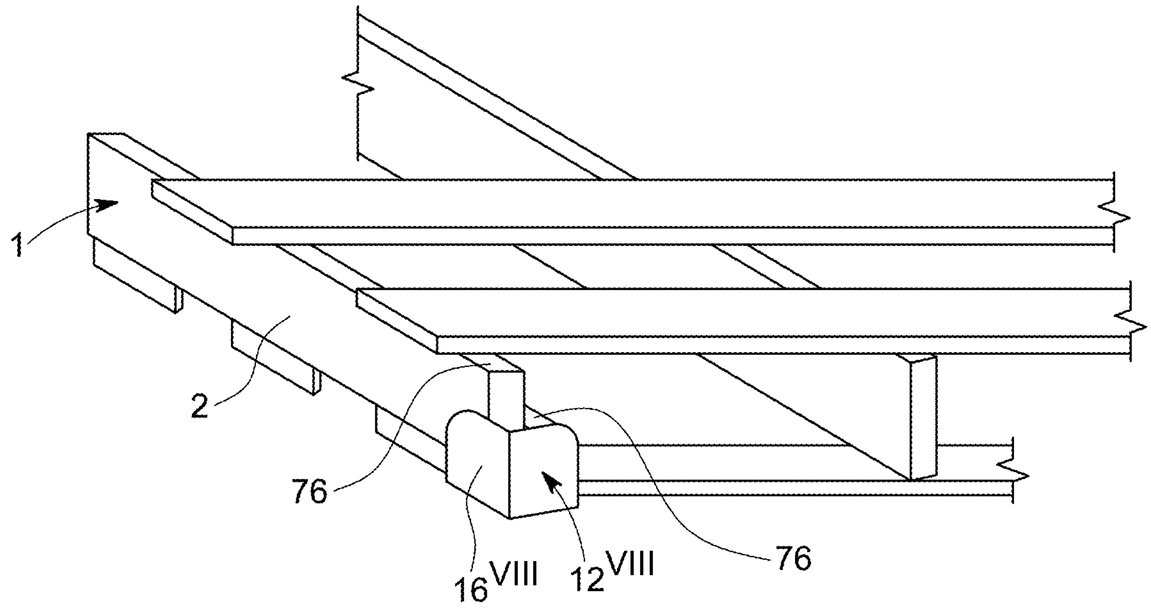
FIG. 35 is a front, top perspective view of the safety-marker base shown in FIG. 33 secured to a pallet corner.
Figure 36:
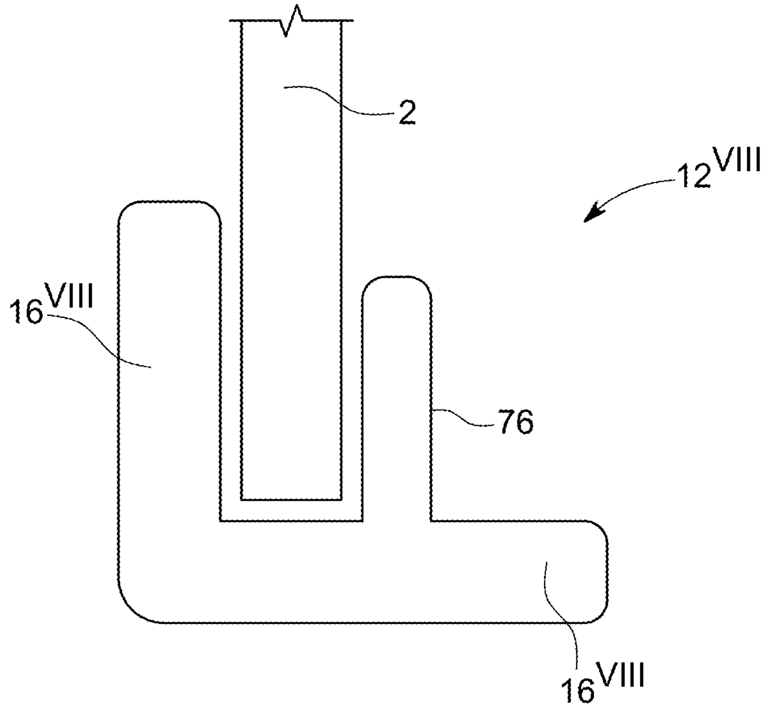
FIG. 36 is a top view of the safety-marker base shown in FIG. 33 secured to an end-frame pallet board.

Referring now to FIGS. 31 and 32, in a still further embodiment of the disclosure, a base, designated generally as $\mathbf{12}^{VII}$, provides a means to secure a base to a pallet regardless the pallet's height or thickness. In this embodiment, base $\mathbf{12}^{VII}$ includes a side plate $\mathbf{16}^{VII}$ and a bottom plate $\mathbf{18}^{VII}$ extending inwardly from a bottom end of side plate $\mathbf{16}^{VII}$ with a tapered leading edge $\mathbf{19}^{VII}$. Side plate $\mathbf{16}^{VII}$ is formed with a plurality of vertically-stacked ratchet teeth 17. A movable top plate $\mathbf{22}^{VII}$ extends inwardly from side plate $\mathbf{16}^{VII}$. Top plate $\mathbf{22}^{VII}$ is formed with an opening at a proximal end that enables the top plate to be fitted over side plate $\mathbf{16}^{VII}$. Extending into the field of the top plate opening is a fixed pawl 72. Pawl 72 is positioned on top plate $\mathbf{22}^{VII}$ so as to extend into the field of ratchet teeth 17.

By pulling top plate $\mathbf{22}^{VII}$ inwardly away from side plate $\mathbf{16}^{VII}$ and tipping a distal end of the top plate 22 upwardly, the top plate can be moved axially from one ratchet tooth 17 to another such that top plate $\mathbf{22}^{VII}$ can be lowered to register against a top surface of a pallet when base $\mathbf{12}^{VII}$ is registered against a corner of a pallet. With the top plate secured against the pallet top, the base is firmly secured to the pallet and not subject to tipping or displacement.

A partial or complete through-bore $\mathbf{23}^{VII}$ (not shown), is formed in a top surface of side plate $\mathbf{16}^{VII}$ to receive safety-marker post 13. Alternatively, base post-receiving rings (not shown) may be used to receive the post. Like base 12", this embodiment of the base provides a more robust registration to a pallet that prevents tipping of the safety marker away from the pallet corner. It should be understood that a lead screw with corresponding threading may be substituted for the ratchet-teeth/pawl structure to incrementally raise and lower the top plate relative to the pallet.

Referring now to FIGS. 33-36, in yet another aspect of the disclosure, a base, designated generally as $\mathbf{10}^{VIII}$, is structured to wrap around an end-frame board 2 of a pallet 1. In this configuration, base $\mathbf{10}^{VIII}$ includes two adjoining side plates $\mathbf{16}^{VIII}$ that form an angle to register against a corner of a pallet. A base hook 76 extends from one of the side plates, substantially parallel to the other side plate so as to form a pocket that receives end-frame board 2. The embodiment of the base is particularly useful when the pallet to which the base is to be secured is heavily loaded with materials and/or product making it difficult to slide one of the other base embodiments disclosed herein under the pallet corner. Use of the "hook" feature essentially releasably locks the base and associated safety-marker apparatus to the pallet in a manner that prevents tipping of the apparatus relative to the pallet. Base hook 76 may be any height as long as it can be fitted within the open end of a pallet and may be comprised of two or more segments like the tines of a fork.

Figure 37:
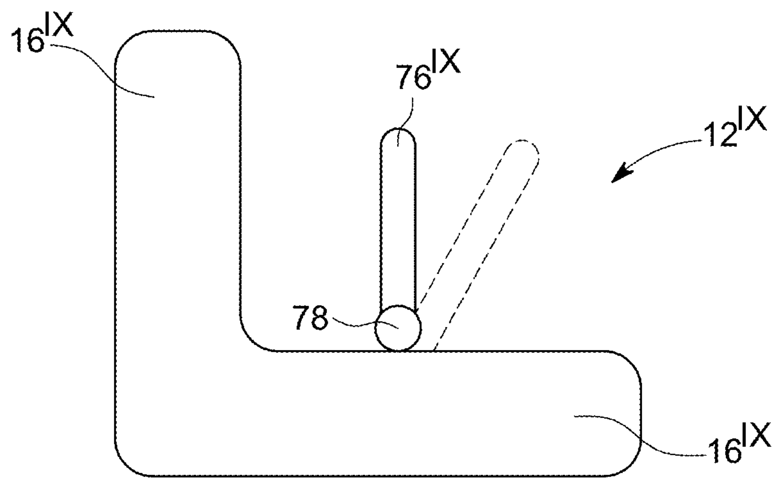
FIG. 37 is a top view in partial phantom of a safety-marker base according to yet another embodiment of the disclosure.
Figure 38:
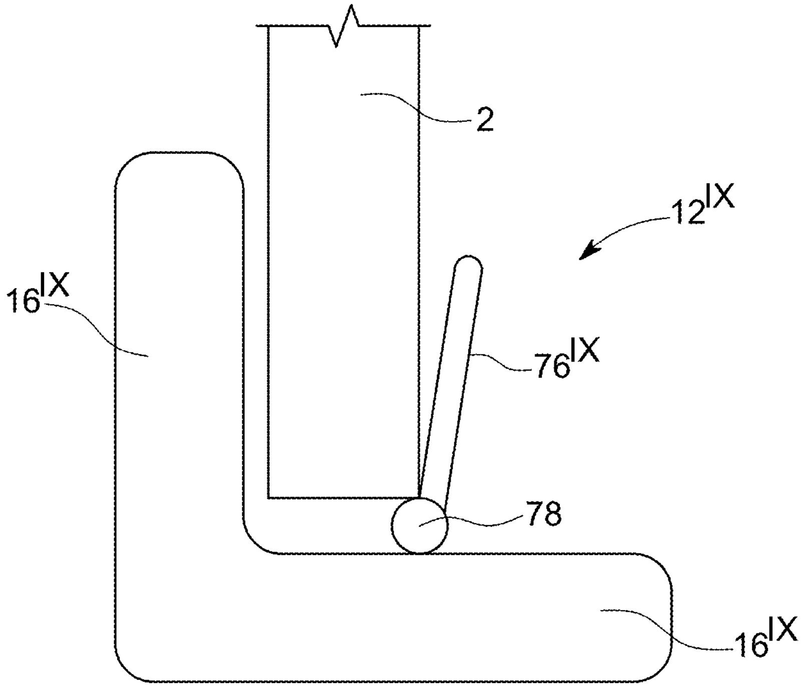
FIG. 38 is a top view of the safety-marker base shown in FIG. 37 secured to an end-frame pallet board.

Referring now to FIGS. 37 and 38, in a still further aspect of the disclosure, a base, designated generally as $\mathbf{10}^{IX}$, includes a deflection hook that accommodates end-frame boards 2 having different thicknesses. More particularly, base 10$^{IX}$ has two adjoined side plates 16$^{IX}$ that form an angle to register against a corner of a pallet. A deflection base hook 76$^{IX}$ is secured to a torsion spring pivot axle or spring-actuated hinge 78 that extends from one of the side plates, with deflection base hook 76$^{IX}$ substantially parallel to the other side plate so as to form a pocket that receives end-frame board 2. By securing the deflection base hook to a pivot axle, the base hook can be deflected, such as shown in FIG. 38, to accommodate end-frame boards 2 with larger thicknesses than the space or pocket defined by side plate 16$^{IX}$ and deflection base hook 76$^{IX}$. Like base 12$^{VIII}$, this embodiment of the base is particularly useful when the pallet to which the base is to be secured is heavily loaded with materials and/or product making it difficult to slide one of the other base embodiments disclosed herein under the pallet corner.

Figure 10:
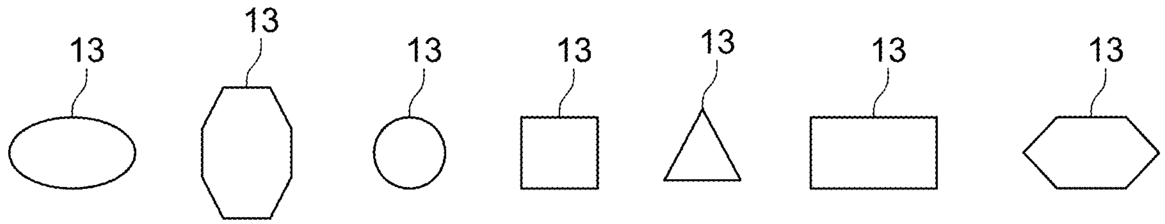
FIG. 10 are top cross-sectional views of pallet safety marker post shaped according to multiple embodiments of the disclosure.

Referring again to the embodiment shown in FIG. 1, post 13 takes the form of a single, cylindrical elongate solid or hollow pole secured at a lower end to base 12. Although shown illustratively as having a round profile in cross-section, post 13 may be formed with any geometrical, cross-sectional shape such as those shown in FIG. 10. In the embodiment shown in FIG. 1, post 13 is set at a selected height intended to fall within the field of vision of a passerby. It should be understood that post 13 may be set at any length and remain within the scope of the disclosure.

Figure 9:
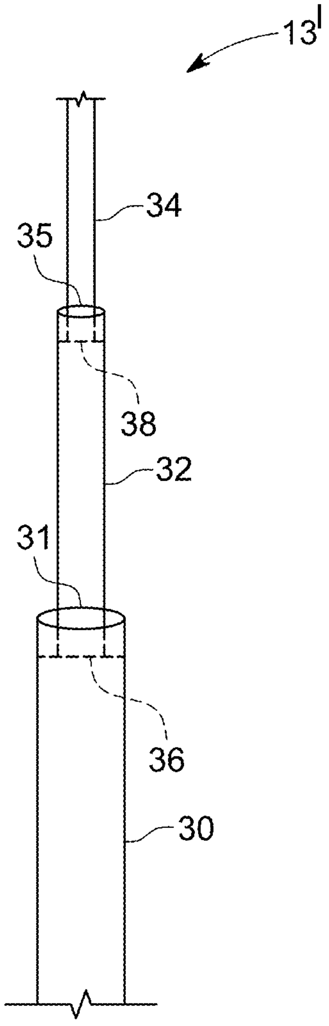
FIG. 9 is a side view in elevation and partial phantom of a pallet safety marker telescopic post according to another embodiment of the disclosure.

Referring now to FIG. 9, to provide adjustability to the height of marker apparatus 10, post 13 may be formed as a telescoping post 13'. As used herein, identical reference characters having differently primed or unprimed variations and assigned to features of the disclosure are intended to identify different embodiments of the same feature. Post 13' includes two or more telescopic sections. An elongate telescopic base section 30 is secured at a lower end to base 12. Telescopic base section 30 may be permanently affixed to base 12 or may be releasably secured to base 12 via an anchor post that includes a snap pin/bore combination securement means.

Telescopic base section 30 is hollow with an upper end open. A base pole-segment restriction ring 31 is formed on, or affixed to, the upper end to function as a stop. Restriction ring 31 defines illustratively, an annular opening having a cross-sectional diameter smaller than the cross-sectional diameter of telescopic base section 30. It should be understood that telescopic base section 30 is described illustratively as having a circular or round shape in cross-section. It should be understood that base section 30 may have any geometrical cross-sectional shape and remain within the scope of the disclosure.

An optional intermediate telescopic section 32 is elongate and formed with a cross-sectional diameter smaller than the cross-sectional diameter of the restriction ring annular opening. Secured to a bottom end of telescopic section 32 is an annular stop plate 36 dimensioned to slide within the hollow chamber of telescopic base section 30. Stop plate 36 may be integral to intermediate telescopic section 32 or affixed to the bottom end of the section. When intermediate telescopic section 32 is fully extended, a top surface of stop plate 36 registers against a bottom surface of pole-segment restriction ring 31 to limit the travel of section 32 relative to telescopic base section 30. In an alternative embodiment, rather than use the stop plate/restriction ring combination, a snap pin/bore combination securement means may be used to set the height of intermediate telescopic section 32.

Formed or affixed to a top end of intermediate telescopic section 32 is an intermediate restriction ring 35 that defines a circular opening having a cross-sectional diameter smaller than the cross-sectional diameter of telescopic section 32. Restriction ring 35 provides a means to limit the axial travel of any telescopic section secured within intermediate telescopic section 32. If a restriction ring is not included with intermediate telescopic section 32, a snap pin/bore combination can be used as an alternate means to set the extension height of any telescopic section secured within section 32.

An elongate top telescopic section 34 is illustratively round in cross-section and has a cross-sectional diameter smaller than the cross-sectional diameter of the circular opening defined by intermediate restriction ring 35. A bottom end of top telescopic section 34 is formed with a top stop plate 38 having a cross-sectional diameter set to permit stop plate 38 to slide within either telescopic base section 30 or intermediate telescopic base section 32, if present. When top telescopic section 34 is fully extended, a top surface of top stop plate 38 registers against a bottom surface of either restriction ring 31 or intermediate restriction ring 35. A snap pin/bore combination may be used in place of the registration plate/restriction ring.

With any telescopic pole structure disclosed herein that uses a registration plate/restriction ring combination to limit the extension of successive telescopic segments, O-rings or detents may be used to maintain the telescopic segments in extended positions. If O-rings are used, an annular O-ring channel can be formed within the lower telescopic segment proximal a top end of the lower segment. The channel functions to hold an O-ring in place during translational movement of adjacent superposed telescopic segments. Due to the elastomeric properties of the O-rings, when a registration plate is urged toward the restriction ring, the registration plate, which has a cross-sectional diameter larger than the cross-sectional diameter of the circular opening defined by the O-ring in a relaxed state, compresses the O-ring into the telescopic segment inner wall and passes over it. Once the registration plate is fully above the O-ring, the O-ring decompresses and reduces the inner cross-sectional diameter of the lower telescopic section and functions as a shoulder that restricts downward movement of the upper telescopic section.

In an alternative means to releasably lock telescopic segments in extended orientations, detents may be formed on the inner walls of the lower telescopic segment proximal an upper end of the segment. For this embodiment, the registration plates are made of a semi-rigid material that permits some flexion of the registration plate when translating along the inner wall of a lower telescopic segment. Once the registration plate reaches the detent, the registration plate flexes outwardly to its maximum planar expansion orientation. The perimeter edge of the registration plate extends into the detent and releasably locks the extension of an upper telescopic segment relative to a lower telescopic segment. The O-ring and detent embodiments are meant to illustrative and non-limiting. Any other means known in the art to secure telescopic segments in extended and nested positions may be used and remain within the scope of the disclosure.

Figure 29:
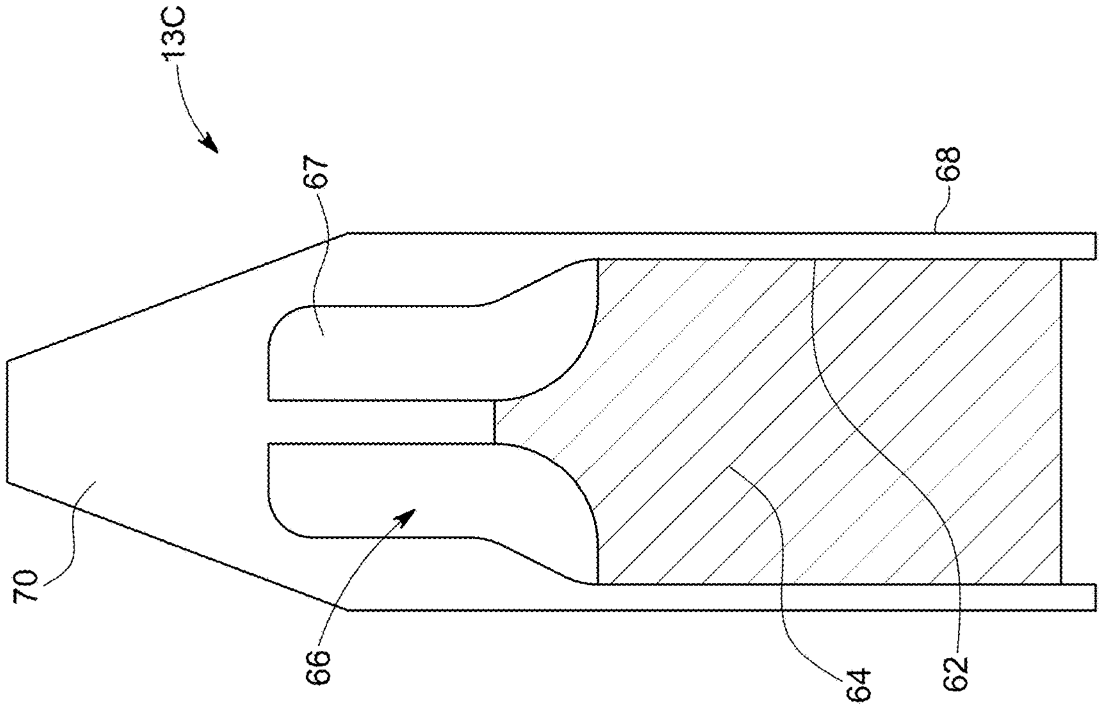
FIG. 29 is a side, sectional view in elevation of a twist-lock according to the embodiment of the disclosure shown in FIG. 28.
Figure 28:
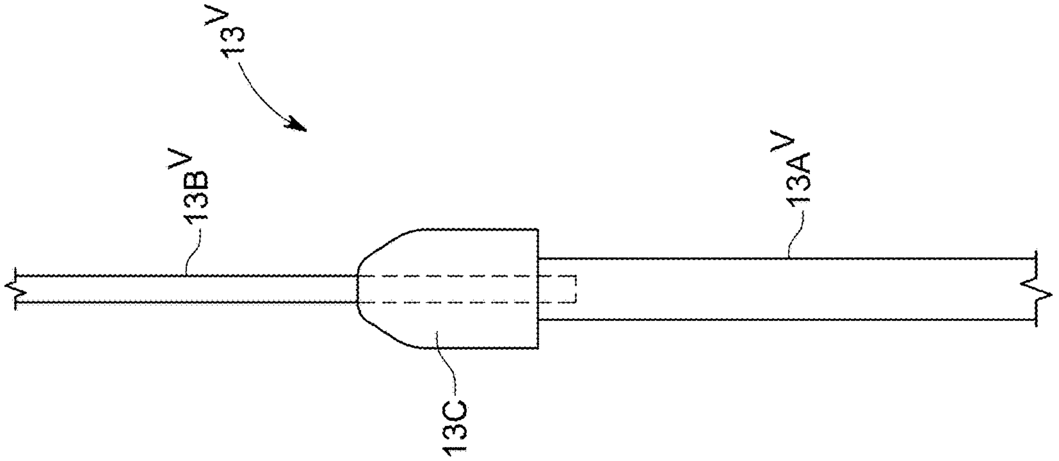
FIG. 28 is a front view in elevation and partial phantom of a telescopic safety-marker post with a twist-lock according to still another embodiment of the disclosure.

Referring now to FIGS. 28 and 29, in a still further embodiment of the disclosure, a twist-lock, telescopic safety-marker pole, designated generally as 13$^{V}$, is formed as a telescopic pole having a base telescopic segment 13A$^{V}$, a bottom end of which is secured to any of the safety-marker bases disclosed herein. An upper telescopic segment 13B$^{V}$ has a cross-sectional diameter smaller than a cross-sectional diameter of base telescopic segment 13A$^{V}$ and fits within the lumen of the base telescopic segment. In this embodiment, rather than using retention rings and restrictions rings and registration plates to limit the extension of the telescopic segments, a twist-lock 13C is used to selectively set the extension of the upper telescopic segment 13B$^{V}$ relative to base telescopic segment 14A$^{V}$. 13A Twist-lock 13C applies a compressive pressure to the outer surface of base telescopic segment 13A$^{V}$ to secure the segment against upper telescopic segment 13B$^{V}$ via rotation of the twist-lock. A tapered inner sleeve 62 defines a cylindrical channel having a cross-sectional diameter to fit over base telescopic segment 13A$^{V}$ and is fixed to the base telescopic segment. Inner sleeve 62 has a bottom sleeve section 64 having threading on an outer surface and an upper tapered, slotted sleeve section 66. The slots run along the axis of the telescopic segments, define flexible tabs 67, and permit the upper section 66 to be compressed so as to reduce the cross-sectional diameter of the section.

An outer shell 68 has a lower section having threading formed on an inner wall surface that engages the threading of the inner sleeve's threaded section. Rotation of the outer shell, depending whether clockwise or counterclockwise, will translate the outer shell 68 axially relative to the inner sleeve 62. A top shell section 70 is tapered. When outer shell 68 is rotated to move the shell downwardly over inner sleeve 62, the tapered shell section 70 registers against flexible tabs 67 and urges them into the outer surface of upper telescopic section 13B$^{V}$ and imparts a compressive force that creates a frictional engagement between twist lock 13C and upper telescopic segment 13B$^{V}$. Counterrotation releases the compressive force and permits the telescopic segments to be axially extended or retracted.

Figure 11:
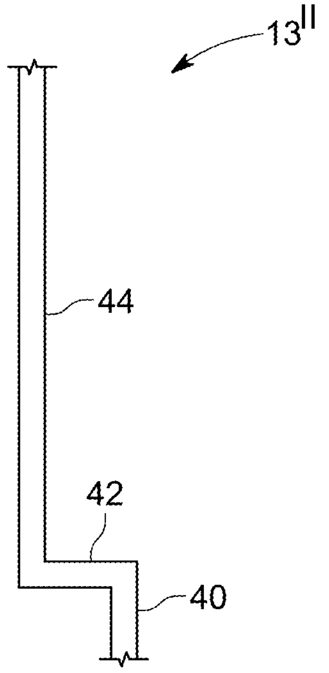
FIG. 11 is a side view in elevation of an offset pallet safety marker post according to a further embodiment of the disclosure.

Referring now to FIG. 11, in yet another embodiment of the disclosure, a post 13" is formed with an offset shaft to provide an enhanced safety measure when a pallet safety marker apparatus is used. Post 13" includes a base shaft 40, the bottom end of which is secured to base 12 by any of the means described for post 13. Base shaft 40 is positioned to have a substantially vertical orientation relative to the planar surface occupied by a pallet set on a floor or on ground. A horizontal shaft 42 is secured to, and extends horizontally from, a top end of base shaft 40. Horizontal shaft 42 does not have to be any particular length but may extend illustratively six to twelve inches in length.

An upper shaft 44 extends substantially vertically from the end of horizontal shaft 42 opposite the end attached to base shaft 40. By offsetting horizontal shaft 42 inwardly relative to the position of base 12 and base shaft 40, a potential bumping obstacle is removed. Anyone walking closely by the corner of the pallet to which the marker apparatus is attached will not encounter the vertical shaft as it will be set back from the corner of the pallet. It should be understood that any embodiments of the safety-marker posts disclosed herein may be offset outwardly, outside the field of an attached pallet, and remain within the scope of the disclosure.

Figure 12:
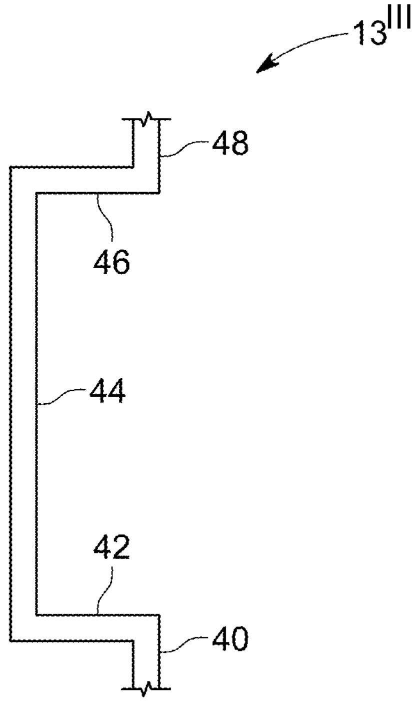
FIG. 12 is a side view in elevation view of an offset pallet safety marker post according to a yet further embodiment of the disclosure.

Referring now to FIG. 12, in a further aspect of the disclosure, a post 13''' includes all the features of post 13" with additional elements. Like post 13", post 13''' includes a base shaft 40, a horizontal shaft 42 extending horizontally away from a top end of base shaft 40 and a vertical upper shaft 44 extending substantially vertically from an end of horizontal shaft 42. A second horizontal shaft 46 extends horizontally from a top end of upper shaft 44. Second horizontal shaft 46 occupies substantially the same vertical plane occupied by horizontal shaft 42 such that the two horizontal shafts are aligned. A second vertical shaft 48 extends substantially vertically from an end of second horizontal shaft 46 and is substantially axially aligned with base shaft 40. When a safety marker (disclosed in more detail hereinbelow), is placed on the top end of second horizontal shaft 46, the safety marker is positioned substantially above the corner of any pallet to which the safety marker apparatus is releasably affixed. Post 13''' provides a means to align a safety marker above a pallet corner without providing a potential bump hazard as the main vertical segment of post 13''', i.e., upper shaft 44, is offset or inset into the field of the pallet relative to the position of the pallet corner.

Figure 16:
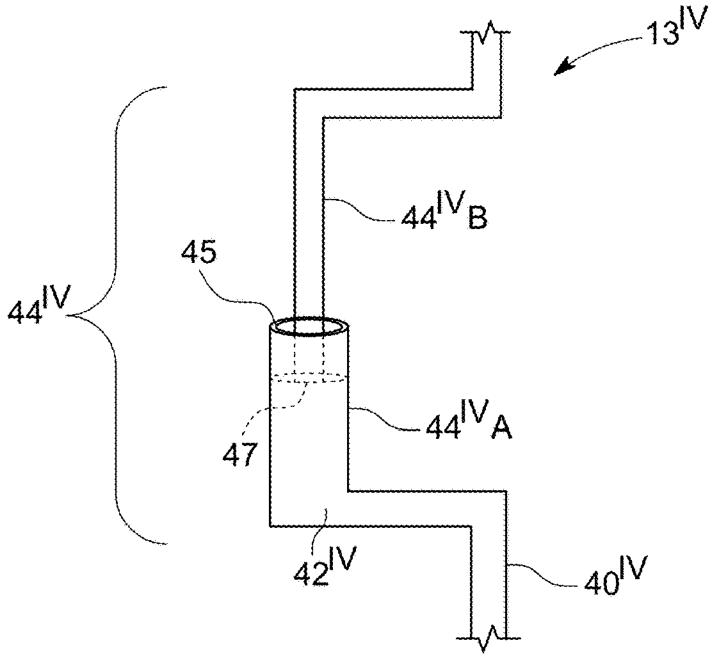
FIG. 16 is a side view in elevation in partial phantom of an offset pallet safety marker post according to a further embodiment of the disclosure.

Referring now to FIG. 16, in a further alternative embodiment of the post element of the safety marker apparatus, an inset telescopic post 13$^{IV}$ includes an upper shaft 44$^{IV}$ formed from telescopic segments. Post 13$^{IV}$ has a base shaft 40$^{IV}$ that extends substantially vertically and is secured to base 12 at a bottom end. Extending horizontally inwardly from a top end of base shaft 40$^{IV}$ is horizontal shaft 42$^{IV}$. A base upper shaft segment 44$^{IV}$A extends vertically from an inner end of horizontal shaft 42$^{IV}$. Base upper shaft segment 44$^{IV}$A is hollow to receive a top upper shaft segment 44$^{IV}$B.

Formed on, or integral to, base upper shaft segment 44$^{IV}$A is a restriction ring 45. Restriction ring 45 defines a circular opening having a cross-sectional diameter smaller than the cross-sectional diameter of base upper shaft segment 44$^{IV}$A. Like restriction ring 35, restriction ring 45 provides a means to limit the axial travel of any telescopic section secured within base upper shaft segment 44$^{IV}$A. If a restriction ring is not included with base upper shaft segment 44$^{IV}$A, a snap pin/bore combination can be used as an alternate means to set the extension height of any telescopic section secured within base upper shaft segment 44$^{IV}$A.

Formed on, or secured to, a bottom end of top upper shaft segment 44$^{IV}$B is a stop plate 47. Stop plate 47 may have any of the structural characteristics of stop plate 38. Stop plate 47 has a cross-sectional diameter set to permit the stop plate to slide within base upper shaft segment 44$^{IV}$A. If an intermediate telescopic segment (not shown) is included in upper shaft 44$^{IV}$, top upper shaft segment 44$^{IV}$B is a stop plate 47 will reside in intermediate telescopic segment. When top upper shaft section 44$^{IV}$B is fully extended, a top surface of top stop plate 47 registers against a bottom surface of either restriction ring 31 or intermediate restriction ring 35. A snap pin/bore combination may be used in place of the registration plate/restriction ring. The O-ring and detent embodiments disclosed herein also may be used to releasably fix the extension of upper shaft segment 44$^{IV}$B relative to base upper shaft segment 44$^{IV}$A.

Extending horizontally and outwardly from upper shaft 44$^{IV}$ is second horizontal shaft 46$^{IV}$. Second horizontal shaft 46$^{IV}$ extends horizontally from a top end of upper shaft 44$^{IV}$. Second horizontal shaft 46$^{IV}$ occupies substantially the same vertical plane occupied by horizontal shaft 42$^{IV}$ such that the two horizontal shafts are aligned. A second vertical shaft 48$^{IV}$ extends substantially vertically from an end of second horizontal shaft 46$^{IV}$ and is substantially axially aligned with base shaft 40$^{IV}$ When a safety marker (disclosed in more detail hereinbelow), is placed on the top end of second horizontal shaft 46$^{IV}$, the safety marker is positioned substantially above the corner of any pallet to which the safety marker apparatus is releasably affixed. Post 13$^{IV}$ provides a means to align a safety marker above a pallet corner without providing a potential bump hazard as the main vertical segment of post 13''', i.e., upper shaft $44^{IV}$, is offset or inset into the field of the pallet relative to the position of the pallet corner.

Figure 40:
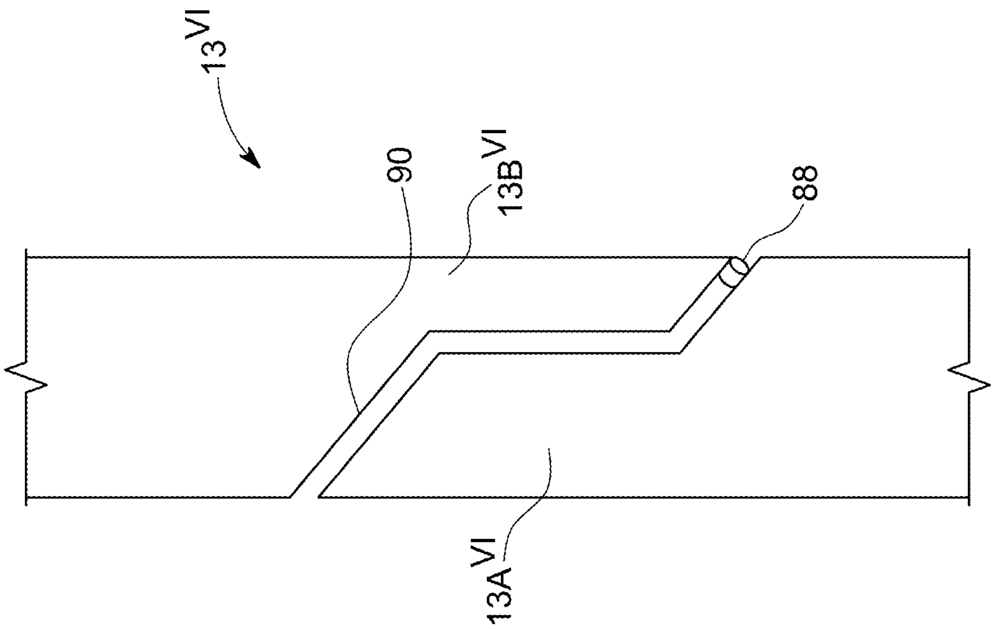
FIG. 40 is a side view in elevation is a safety-marker post with tilting function according to a still further embodiment of the disclosure.
Figure 41:
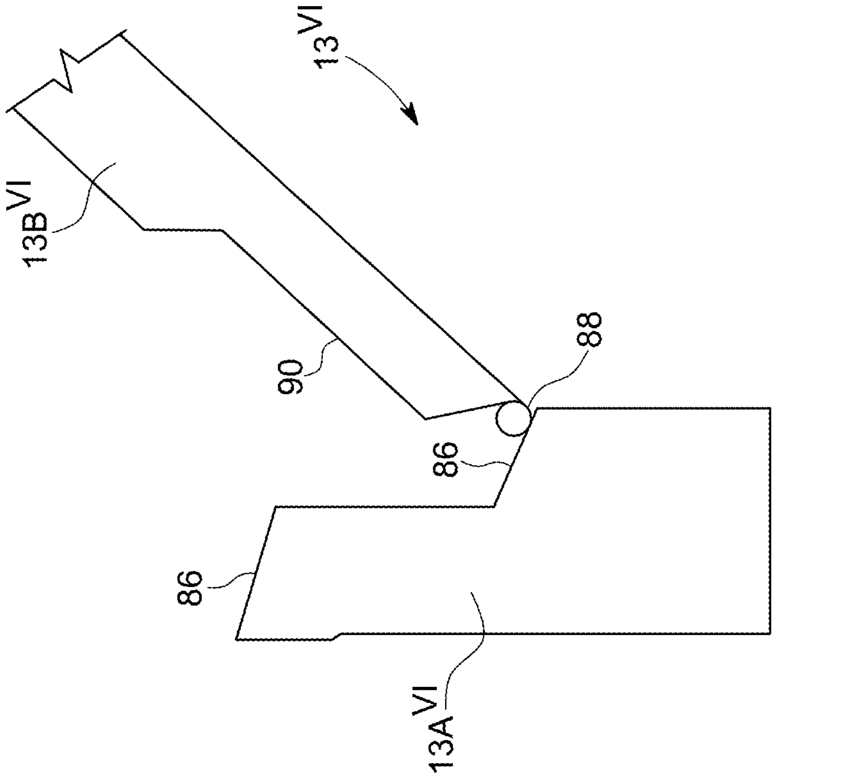
FIG. 41 is a side view in elevation of the tilting safety-marker post shown in FIG. 40 in a tilted position.
Figure 42:
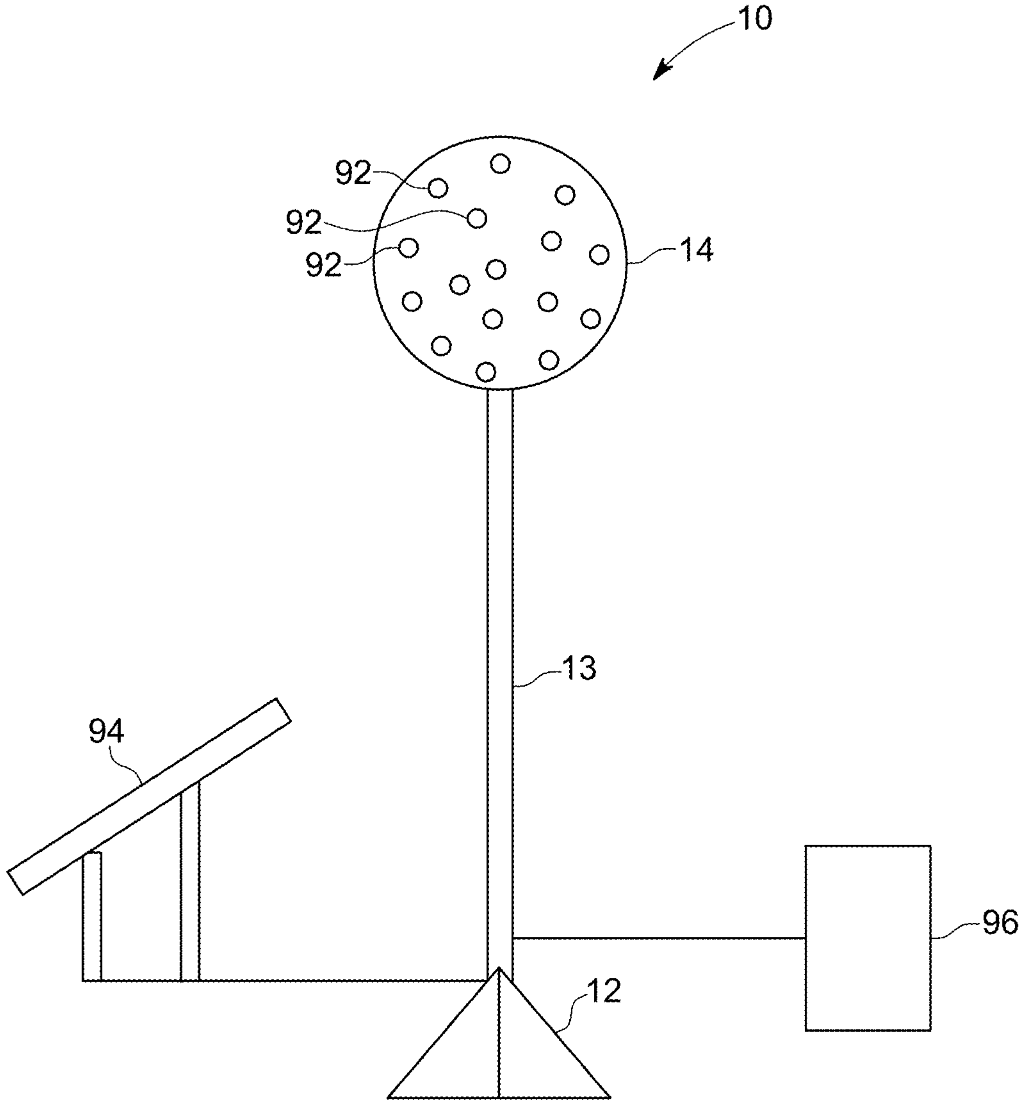
FIG. 42 is a front view in elevation of a pallet safety marker apparatus according to another embodiment of the disclosure.

Referring now to FIGS. 40 and 41, in a further aspect of the disclosure, a tilt safety-marker post, designated generally as $\mathbf{13}^{VI}$, is structured to enable the post to be titled to facilitate removal of a safety-marker apparatus from under the corner of a pallet. More particularly, tilt safety-marker post $\mathbf{13}^{VI}$ includes a post base $\mathbf{13}A^{VI}$ having a two-tier sloped distal end 86. Secured to a lower end of the two-tier sloped distal end is a post hinge 88 having a torsion spring to maintain the hinge in a closed position absent the application of an opposing force. Tilt safety-marker post $\mathbf{13}^{VI}$ further includes an upper post $\mathbf{13}B^{VI}$ that includes an upper two-tiered sloped proximal end 90. Sloped proximal end 90 is secured to post hinge 88 as a lowermost end.

In a closed position, post base $\mathbf{13}A^{VI}$ and upper post $\mathbf{13}B^{VI}$ are aligned and occupy the same axially-oriented axis. This is the position of the tiltable post $\mathbf{13}^{VI}$ when a safety-market apparatus is used to provide a warning function with respect to a pallet to which the apparatus is attached. To remove the safety-marker apparatus from a pallet, upper post $\mathbf{13}B^{VI}$ is grasped and pulled away from pallet to rotate the upper post away from post base $\mathbf{13}A^{VI}$. By pulling the upper post away from the post base, the removal force applied to remove the apparatus from the pallet is lowered to post hinge 88. As post hinge 88 is positioned in close proximity to the apparatus' base, which can be any of the apparatus bases disclosed herein, the removal force is applied more directly to the apparatus base as compared to a removal force applied to a single-piece post or even a telescopic post. By applying a similar removal force to a single-piece post or telescopic post, the force has to travel down the post to the apparatus base with much of the force, in the form of a vertical force vector, wasted as the force needed to remove the apparatus base from under a pallet is a horizontal force vector. By using a tilt safety-marker post, the angle between the vertical and horizontal force vectors is much smaller so that much more of the vertical force vector directly adds to the horizontal force vector to remove the apparatus base from the pallet. Thus, a smaller overall force is needed to remove the safety-marker base from the pallet.

With any of the posts disclosed herein, the surfaces of the posts may be formed, treated or wrapped to further enhance the safety warning effect. To that end, the posts may be formed, treated or wrapped with reflective materials and/or paints in solid, alternating dark and light-shaded stipes, patchwork color patterns, etc. to impart the intended visual effect. Moreover, the posts also can be made transparent or translucent and have fillers that impart distinct, visual attention-grabbing effects. In yet further alternative embodiments, the posts may include solar-powered, light-imparting diodes to attract the attention of, and impart a visual warning to, passersby. With such an embodiment, one or more solar panels, resident or remote from the posts, will be incorporated into the apparatus to provide the electrical current necessary to activate the diodes. Luminescent materials such as phosphors that absorb energy from light sources, including the sun during the day and emit light energy when in a dark or darkened environment, also may be used to construct the posts or other components of the safety-marker apparatuses disclosed herein. Other light-imparting devices also may be used and remain within the scope of the disclosure.

With respect to dimensional aspects of the disclosed posts, any cross-sectional and elongate dimensions may be used and remain within the scope of the disclosure. For purposes of illustration, non-limiting dimensions for the disclosed posts can include cross-sectional diameters of from about ⅛ inch to about ½ inch. Further illustrative, non-limiting dimensions for the length of the posts can include lengths from about 24 inches to about 72 inches. With respect to the selection of post dimensions, the goal is to elevate the safety marker/topper (disclosed in more detail hereinbelow), to fall within the field of vision of a passerby. Such dimensional selection can take into account standardized dimensional values used in industry with respect to safety standards.

Referring again to FIG. 1, a safety marker or topper 14 is secured to a top end of any post disclosed herein including post 13, post 13', post 13'', post 13''' and post $\mathbf{13}^{IV}$. Topper 14 is constructed to impart a visually distinct, attention-attracting image that functions as a warning. To gain the immediate attention of a passerby, topper 14 is formed with surface treatments and/or made from materials that impart high visibility and distinct resolution relative to anything else in the immediate vicinity of the safety marker. This includes materials that are reflective, light-refractive, glowing, and/or brightly colored to capture one's attention in one's field of vision during ambulation or any type of movement around empty or product-laden pallets. In an alternate embodiment, safety marker/topper 14 may be constructed with a translucent or transparent outer shell with fillers that impart distinct, visual attention-grabbing effects such as diodes or other lighting 92 powered by solar panels 94 or batteries 96 as shown in FIG. 41 and as is well known in the art.

Figure 13:
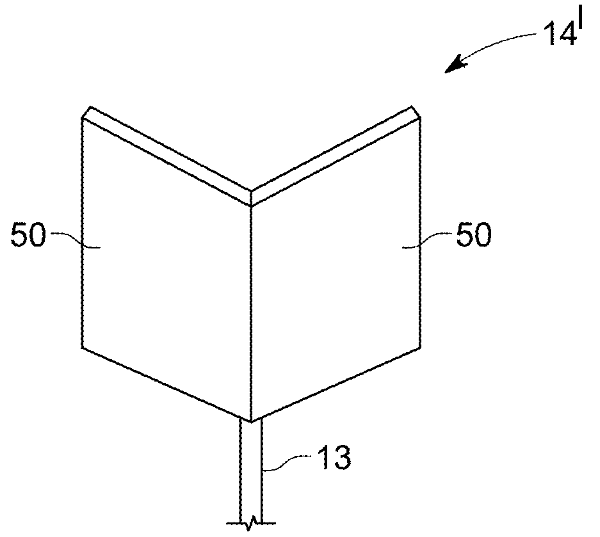
FIG. 13 is a front, top perspective view of a pallet safety marker head according to another embodiment of the disclosure.

With respect to the geometric aspects of safety marker/topper 14, shapes that run the gamut of geometric configurations may be used. Illustrative, non-limiting examples include spherical, pyramidal, triangular, square (two- and three-dimension), rectangular (two- and three-dimension), conical, frusto-conical, ovoid, truncated icosahedron and the like. The marker/toppers may be solid and made from such materials as Styrofoam, or hollow and made from rigid, semi-rigid polymers, or inflatable plastics. As shown in FIG. 1, a spherically-shaped topper 14 may be used to provide omnidirectional attraction and warning. In another embodiment shown in FIG. 13, a safety marker/topper 14' may be formed as two square and/or rectangular panels 50 joined together and set at an approximately 90° angle to provide warning in two directions that represent the two sides of a pallet that intersect to form a corner.

Figure 14:
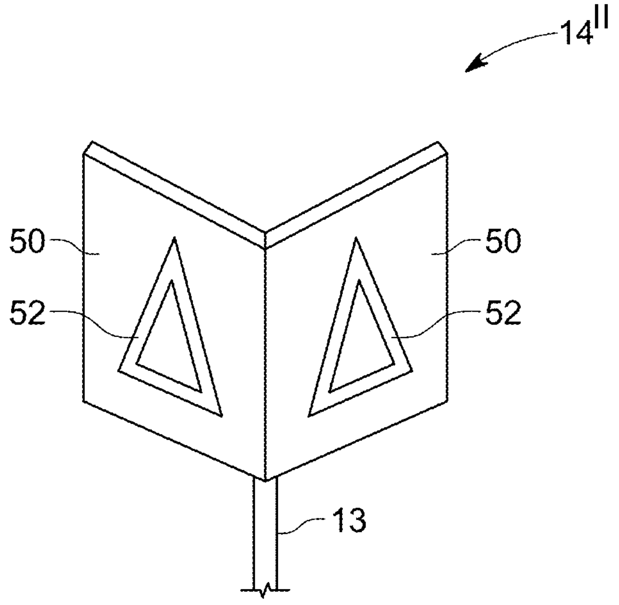
FIG. 14 is a front, top perspective view of a pallet safety marker head with warning triangles affixed thereto according to yet another embodiment of the disclosure.
Figure 15:
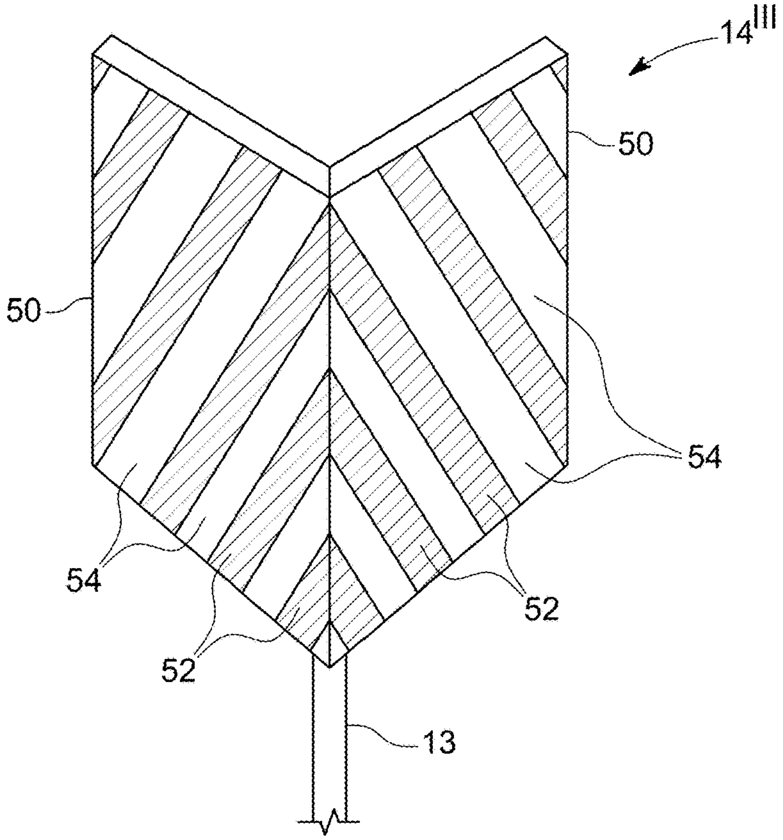
FIG. 15 is a front, top perspective view of a pallet safety marker head with warning stripes affixed thereto according to a further embodiment of the disclosure.

In a yet further embodiment as shown in FIG. 14, a safety marker/topper 14'' includes the same panels 50 with warning triangles 52 affixed to the outer surfaces of the panels. To further enhance the visual effect of the triangles 52, the triangles may be colored differently than the color of panels 50 and/or be formed from reflective materials to further grab the attention of anyone passing by the pallet to which the safety marker apparatus is attached. The triangles also may be formed as triangular frames with removable inserts that can be varied in terms of color pattern, wording, etc. In a still further embodiment, a safety marker/topper 14''' may be covered in a series of alternating, differently-colored stripes, 52 and 54, to form a chevron pattern. The stripes also may be formed from reflective materials to enhance the visual attraction effect. It should be understood that shapes other than the warning triangle shape may be used to impart a warning notification and remain within the scope of the disclosure.

The means used to mount any of the safety marker/toppers disclosed herein will depend, at least in part, on the materials and shapes used for the component. For solid, spherical safety markers/toppers, a bore hole can be formed in the bottom of the component to receive a top of the safety-marker posts disclosed herein. For hollow and/or inflatable embodiments, a plate (not shown) may be formed on, or secured to, a top of the safety-marker posts to support the safety markers/toppers. Adhesives or sonic welding may be used to secure the safety markers/toppers to the plate. The plate also may be used with mechanical fasteners to secure a solid safety marker/topper to a safety-marker post. Apart from these illustrative, non-limiting examples, the means used to secure the safety markers/toppers to the safety-marker posts can be any means known in the art to secure objects to posts.

Figure 17:
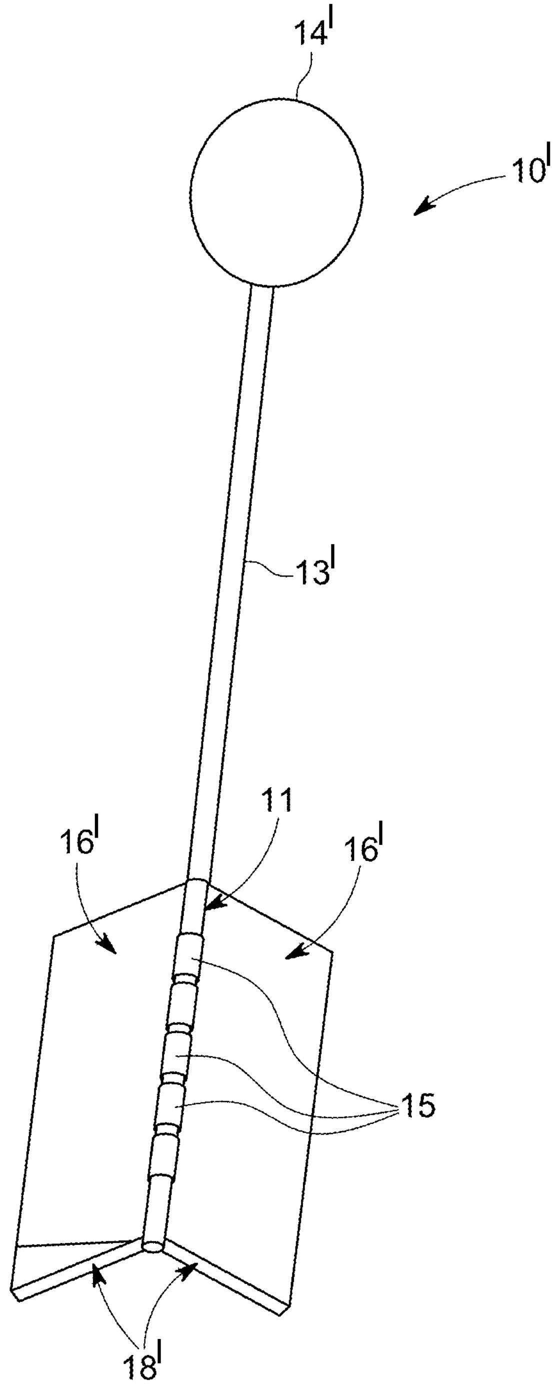
FIG. 17 is a front perspective view of a complete pallet safety marker according to the embodiment shown in FIG. 3.

Referring now to FIG. 17, in a further aspect of the disclosure, a safety marker apparatus 10' includes a hinged base 12' consisting of two leaves or side plates 16' joined together via a barrel, shown generally as 11, formed of interlocking knuckles 15. A bottom end of safety-marker post 13' functions as a pin securing the side plates together. Extending inwardly from a bottom edge of each side plate 16' is a flange 18' each of which may be formed with a tapered leading edge to facilitate insertion under a pallet corner. A safety marker or topper 14' is secured to a top end of safety-marker post 13'. This safety marker provides a base adaptable to differently configured pallets. For an octagonal pallet, the hinged slide plates can be rotated to register against the sides of the pallet that intersect to form a corner with an angle less than 90°.

Figure 20:
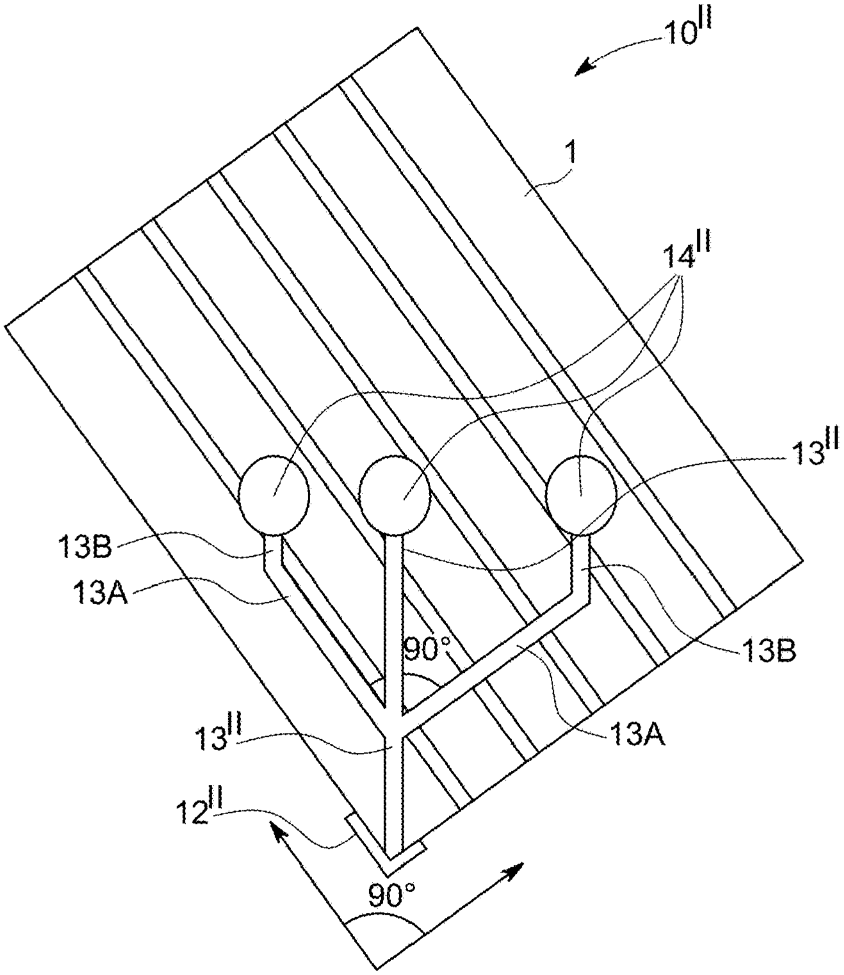
FIG. 20 is a top, perspective view of a safety-marker apparatus having extension arms and additional safety markers/toppers aligned with the sides of a pallet according to a further embodiment of the disclosure.
Figure 21:
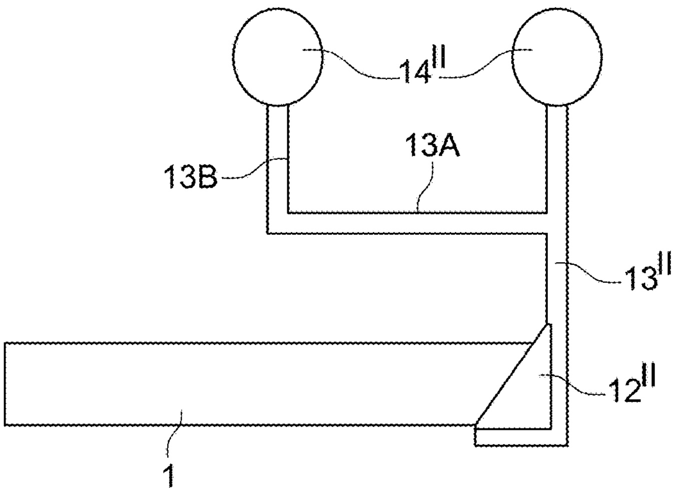
FIG. 21 is a side view in elevation of the safety-marker apparatus embodiment shown in FIG. 20.

Referring now to FIGS. 20 and 21, in a further aspect of the disclosure, a safety-marker apparatus, designated generally as 10", includes a pair of extension arms to provide a visual warning that highlights or signifies the edges or sides of a pallet. More particularly, safety-marker apparatus 10" has a base 12" that may be formed in accordance with any of the apparatus bases disclosed herein. Base 12" is secured to a pallet 1. A safety-marker post 13" extends upwardly from base 12". One or more horizontal extension arms 13A extend laterally from post 13" and may be set at a 90° angle, if two horizontal extension arms are used, to match the angle of the corner formed by the intersecting sides of a pallet. It should be understood that the angle may be modified to any other angle to match the angle formed by a pallet corner.

Extending upwardly from distal ends of horizontal extension arms 13A are vertical extension arms 13B. The upward extensions may be of any length so as to fall within the field of vision of a passerby and may be set to be substantially vertical or any vertically offset orientation to position the extension arm above a pallet side. Attached to a top, distal end of each vertical extension arm 13B and a top of post 13" are safety markers 14". Safety markers 14" may take the form of any of the safety markers disclosed herein. A safety-marker apparatus 10" can be placed at each corner of a pallet or to any exposed pallet corner to provide a complete visual warning of the pallet's presence and spatial location relative to a passerby seeing the safety marker apparatus.

Figure 22:
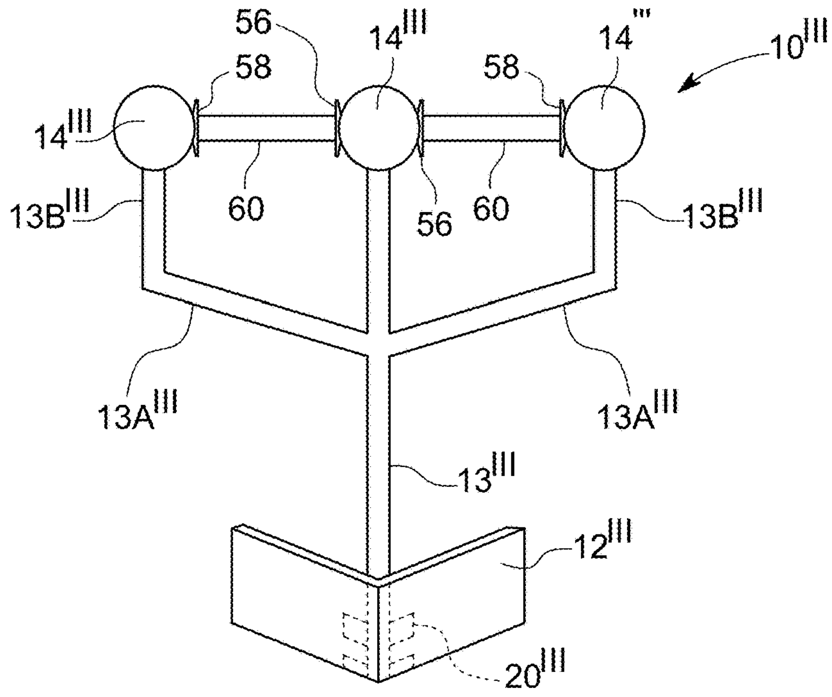
FIG. 22 is a front perspective view of a safety-marker apparatus having extension arms, additional safety markers/toppers and retractable safety bands aligned with the sides of a pallet and stretched between safety markers/toppers according to a yet further embodiment of the disclosure.

Referring now to FIG. 22, in a further embodiment of the safety-marker apparatus shown in FIGS. 20 and 21, a safety-marker apparatus, designated generally as 10''', includes the same features as safety-marker apparatus 10" with the addition of extendable/retractable safety bands. More particularly, safety-marker apparatus 10''' includes a base 12''' structured to be secured to a pallet. A safety-marker post 13''' extends upwardly from base 12''' and is secured to the base via post-receiving bores or rings 20'''. One or more horizontal extension arms 13A''' extend laterally from post 13'''. If two horizontal extension arms are used, the extension arms may be set at a 90° angle or at any angle that matches the angle formed by the pallet corner to which the safety-marker apparatus is attached.

Extending upwardly from a distal end of each horizontal extension arm is a vertical extension arm 13B'''. Like vertical extension arms 13B, horizontal extension arms 13B''' may be any length and set to be substantially vertical or to any vertically-offset orientation so as to be positioned above a side of a pallet. Attached to a top, distal end of each vertical extension arm 13B''' and a top of post 13''' are safety markers 14'''. Safety markers 14''' may take the form of any of the safety markers disclosed herein.

Secured within the safety marker 14''' is a rolled expandable/retractable safety band 60. Safety band 60 extends out of one side of the safety marker and has a leading end with a buckle tongue 56 or similar attachment. Secured to the safety marker at a point opposite the exit point or area of the safety band is a safety band buckle 58 having features to receive and releasably engage buckle tongue 56. In an alternate embodiment, two safety bands 60 are secured in a center safety marker 14''', the safety marker secured to the top of post 13'''. In this embodiment, each safety band extends out of a dedicated slot in the safety marker with the slots formed on opposite sides of the safety marker. These safety bands each have a buckle tongue 56. Each safety marker 14''' secured to one of the vertical extension arms 13B''' has a buckle 58 secured thereto and positioned to face one of the safety bands 60. To create an extended barrier or safety warning, the safety bands 60 may be extended and secured to safety buckles 58 via engagement with buckle tongues 56 as shown in FIG. 22.

Figure 23:
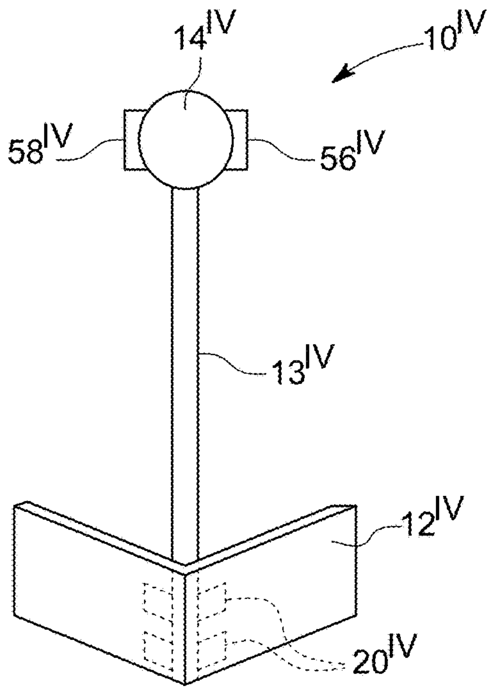
FIG. 23 is a front perspective view in partial phantom of a single-pole safety-marker apparatus having a safety marker/topper with an extendable/retractable safety band/belt with a tongue connector and a band-receiving buckle or receiving connector according to another embodiment of the disclosure.
Figure 24:
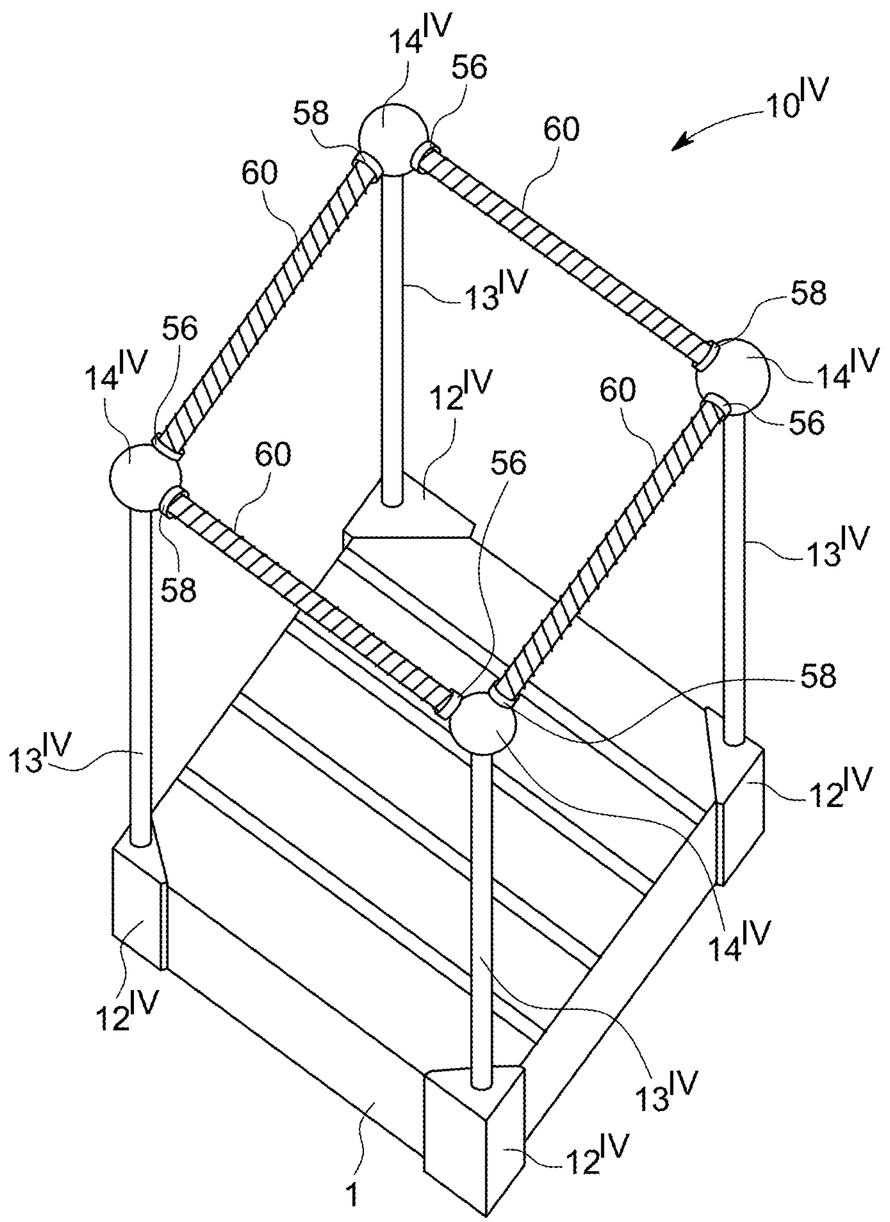
FIG. 24 is a front, top perspective view of a plurality of single-pole safety-marker apparatuses each secured to a corner of a quadrilateral pallet and connected tougher with safety bands/belts according to the embodiment shown in FIG. 23.

Referring now to FIGS. 23 and 24, in yet another aspect of the disclosure, a safety-marker, designated generally as 10$^{IV}$, has a base 10$^{IV}$ that may take the form of any base disclosed herein. A safety-marker post 13$^{IV}$ extends substantially vertically from base 10$^{IV}$ and is secured to the base via one or more post-receiving bores or rings 20$^{IV}$. Secured to a top of safety-marker post 13$^{IV}$ is a safety marker 14$^{IV}$. Secured within safety marker 14$^{IV}$ is a rolled expandable/retractable safety band 60. Safety band 60 extends out of one side of the safety marker and has a leading end with a buckle tongue 56 or similar attachment. Secured to the safety marker at a point opposite the exit point or area of the safety band is a safety band buckle 58 having features to receive and releasably engage buckle tongue 56.

As shown in FIG. 24, safety-marker apparatus 10$^{IV}$ provides a means to fully encircle a pallet with a continuous safety warning by setting a safety-marker apparatus 10$^{IV}$ at each corner. Next each safety band 60 is extended from one safety-marker 14$^{IV}$ to an adjacent safety marker 14$^{IV}$ (opposite the safety band). Each safety band 60 is secured via tongue 56 of the safety band to the latter safety marker via the safety band buckle 58 of the latter safety marker. By securing each safety band to a safety band buckle of an adjacent safety marker, a pallet can be completely surrounded by the safety apparatus as shown in FIG. 24. Any passerby coming from any direction will see the visual warning provided by the combined safety-marker apparatuses.

Figure 25:
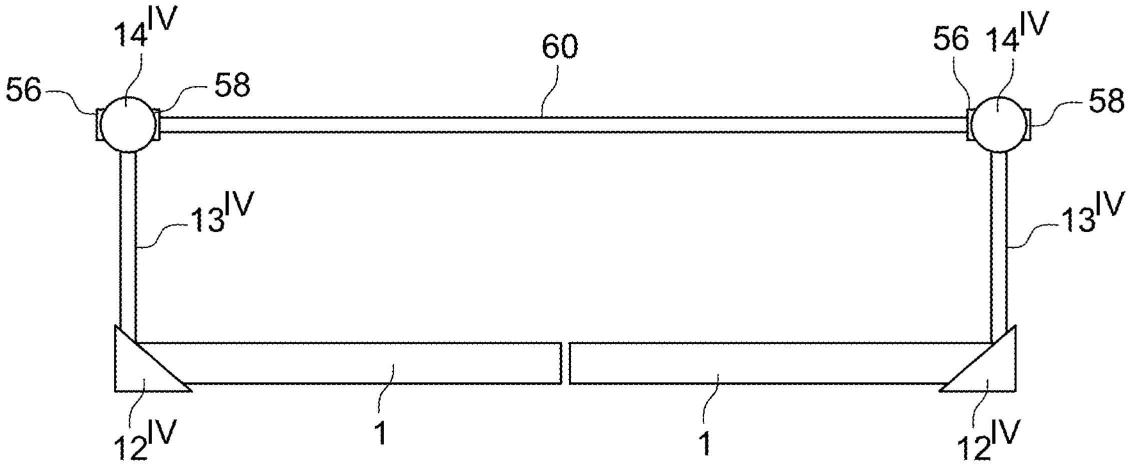
FIG. 25 is a side view in elevation of two safety-marker apparatuses connected together with a safety band and secured to a pair of adjacent pallets according to another embodiment of the disclosure.

Safety marker apparatus 10$^{IV}$ also provides a means to establish a continuous safety warning to sets of pallets. In an illustrative example shown in FIG. 25, two pallets are positioned adjacent one another. The far corners of the pallets have a safety-marker 10$^{IV}$ secured thereto. A safety band 60 of one of the safety marker apparatuses is extended and attached to the other safety marker apparatus. This provides a continuous safety warning "wall" along the joined lengths of the pallets 1. Moreover, use of safety bands 60 enables the safety-marker apparatuses to have multiple additional uses.

As illustrative, non-limiting examples, the safety bands can be imprinted with warning labels, expiration labels with expiration dates, instructions, etc. Provided with these label features, the safety-marker apparatuses $10^{IV}$ can be placed in front of, or around, specific pallets to provide warnings/instructions for materials and/or goods stored on the pallets. For example, in a grocery-store setting, a group of pallets can be cordoned off with safety marker apparatuses that indicate the expiration date of the food stuffs on the pallet.

Figure 39:
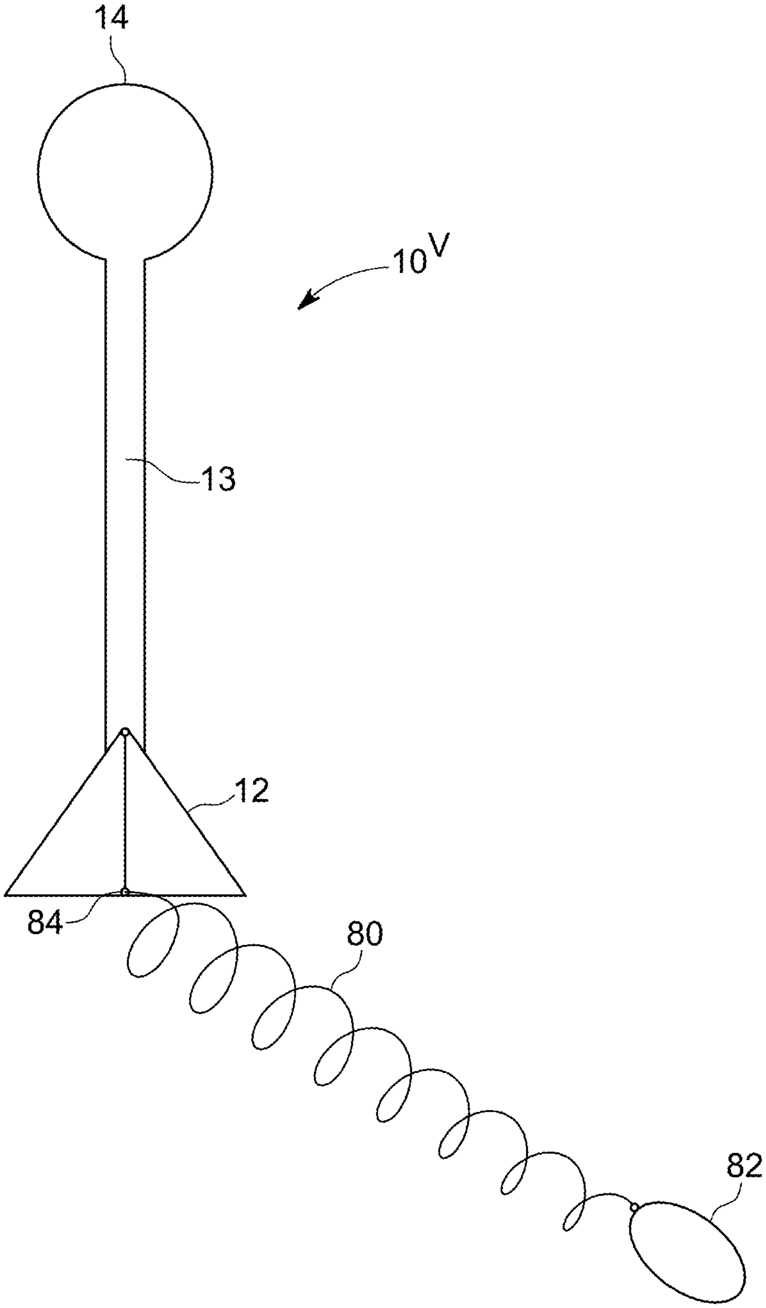
FIG. 39 is a front view in elevation of a safety-marker apparatus according to a further embodiment of the disclosure.

Referring now to FIG. 39, in another embodiment of the disclosure, a safety-marker apparatus, designated generally as $10^{V}$, has the same features as safety-marker apparatus 10 with the inclusion of an apparatus removal cord. More particularly, safety-marker apparatus 10 has a base $12^{V}$, a safety-marker post $13^{V}$ and a safety marker head $14^{V}$. Added to these features is an apparatus removal cord 80. A distal end of removal cord 80 may be formed as a loop 82 to facilitate grasping of the cord. A proximal end 84 is fixed to base $12^{V}$ via any means known in the art such as tied to hook loop (not shown) and secured via adhesive and/or mechanical fastener. Apparatus removal cord 80 provides a means to facilitate the removal of safety-marker apparatus $10^{V}$ from a pallet to which the apparatus is secured by providing a means to apply a removal force directly to the base. To store the cord when not in use, the cord may be wrapped around post $13^{V}$, secured to a hook or similar component, or incorporated into a retractable, coil-spring operated cord retention housing such as those commonly found on lawn mowers. Any means used to store the cord should be deemed within the scope of the disclosure.

Each of the components of the pallet safety marker apparatus can be manufactured from a variety of materials and remain within the scope of the disclosure. Metals such as iron, steel, stainless steel, magnesium enhanced metals, aluminum and the like may be used. Polymers in the broad categories of thermoset and thermoplastic polymers that include specific polymers such as ABS, polycarbonate, RPVC, PVC, Styrofoam, polypropylene, polyethylene and nylon may be used to make any of the individual components. Any of the components disclosed herein can be made to be solid or hollow. To facilitate insertion and removal of the safety-marker apparatuses disclosed herein, components of the apparatuses, such as the bases, may be formed with or coated with materials exhibiting natural lubricity and/or low friction characteristics such as polytetrafluoroethylene (PTFE), also known as Teflon®.

While the present disclosure has been described in connection with several embodiments thereof, it will be apparent to those skilled in the art that many changes and modifications may be made without departing from the true spirit and scope of the present disclosure. Moreover, it should be readily understood that the pallet safety marker apparatuses disclosed herein may be used in association with other devices and articles in various fields in order to provide the same visual warning effect. The safety marker apparatuses are applicable to both factory settings and construction settings among many possible applications. Accordingly, it is intended by the appended claims to cover all such changes and modifications and usages that come within the true spirit and scope of the disclosure.

What we claim as new and desire to secure by United States Letters Patent is:

1. A safety-marker apparatus comprising:

a base having two side plates having bottom ends and vertically-oriented lateral edges, and a substantially triangular base plate secured to the side plate bottom ends, wherein the base plate has opposing base-plate ends that each extend the substantial length of one of the two side plate bottom ends, wherein the two side plates are joined along the vertically-oriented lateral edges to form an angle, and wherein the combination of the joined side plates and the base plate form a single substantially triangular enclosed corner;

a safety-marker post having a bottom end and a top end, wherein the bottom end is secured to the base, wherein the post extends upwardly from the base; and, a safety marker/topper secured to a top end of the post, wherein the safety marker/topper is formed with colors, textures and/or reflective material to impart a visually-distinct warning.

2. The safety-marker apparatus of claim 1 wherein the base plate has a tapered leading edge.

3. The safety-marker apparatus of claim 1 wherein the safety-marker post is covered in reflective tape.

4. The safety-marker apparatus of claim 1 wherein the safety marker/topper is spherical with luminescent coloring.

5. The safety-marker apparatus of claim 1 wherein the safety marker/topper is a translucent or transparent hollow sphere with lighting enclosed within the sphere.

6. The safety-marker apparatus of claim 5 further comprising solar panels or batteries to power the lighting.

7. The safety-marker apparatus of claim 1 wherein the safety marker/topper is formed with a quadrilateral shape with a rectangular warning sign affixed to a face of the quadrilateral safety marker/topper.

8. The safety-marker apparatus of claim 1 wherein the safety marker/topper is formed with a quadrilateral shape, wherein the safety marker/topper is covered in stripes of reflective tape, wherein alternating stripes are formed with different colors.

9. The safety-marker apparatus of claim 1 wherein the safety-marker post comprises a post base with a two-tier distal end and a post hinge secured to a lower end of the two-tier sloped distal end.

10. The safety-marker apparatus of claim 9 wherein the safety-marker post further comprises an upper post with an upper two-tiered proximal end, wherein the upper two-tiered sloped proximal end is secured to the post hinge.

11. The safety-marker apparatus of claim 1 wherein the base has portions defining post-receiving bores or rings dimensioned to receive the safety-marker post.

12. The safety-marker apparatus of claim 11 wherein one of the post-receiving bores or rings is positioned proximal to a lower end of the two side plates and a second post-receiving bore or ring is positioned proximal to an upper end of the two side plates.

13. The safety-marker apparatus of claim 12 wherein at least one of the post-receiving bores or rings is formed with at least one ring bore and the safety marker post is formed with a pin bore.

14. The safety-marker apparatus of claim 13 further comprising a snap pin, wherein the snap pin is secured in the safety-marker post and snapped into the at least one ring bore.

15. The safety-marker apparatus of claim 12 wherein the safety marker/topper is spherical with luminescent coloring.

16. The safety-marker apparatus of claim 12 wherein the safety marker/topper is a translucent or transparent hollow sphere with lighting enclosed within the sphere.

17. The safety-marker apparatus of claim 12 wherein the safety marker/topper is formed with a quadrilateral shape with a rectangular warning sign affixed to a face of the quadrilateral safety marker/topper.

18. The safety-marker apparatus of claim 1 wherein the safety marker/topper is formed with a quadrilateral shape, wherein the safety marker/topper is covered in stripes of reflective tape, wherein alternating stripes are formed with different colors.

* * * * *